United States Patent
Pilli et al.

(10) Patent No.: US 12,339,836 B2
(45) Date of Patent: Jun. 24, 2025

(54) DATASOURCE INTROSPECTION USER INTERFACE FOR GRAPHQL API SCHEMA AND RESOLVER GENERATION

(71) Applicant: Oracle International Corporation, Redwood Shores, CA (US)

(72) Inventors: Naveen Pilli, Milton (CA); Gordon James Yorke, Fall River (CA); Andrei Korostelev, Maynooth (IE); Arun Kiran Patro, Hyderabad (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 18/322,352

(22) Filed: May 23, 2023

(65) Prior Publication Data
US 2024/0394248 A1    Nov. 28, 2024

(51) Int. Cl.
G06F 16/00    (2019.01)
G06F 16/21    (2019.01)
G06F 16/242   (2019.01)

(52) U.S. Cl.
CPC ........ G06F 16/2423 (2019.01); G06F 16/211 (2019.01)

(58) Field of Classification Search
CPC .................. G06F 16/211; G06F 16/2423
(Continued)

(56) References Cited

U.S. PATENT DOCUMENTS 9,009,137 B2    4/2015   Khosravy et al.
9,418,085 B1    8/2016   Shih et al.
(Continued)

FOREIGN PATENT DOCUMENTS

CN    111198678 A    5/2020

OTHER PUBLICATIONS

An Overview of GraphQL, Hasura, Available Online at: https://hasura.io/graphql/, Accessed from Internet on Dec. 26, 2022, 1 page.
(Continued)

*Primary Examiner* — Ann J Lo
*Assistant Examiner* — Rezwanul Mahmood
(74) *Attorney, Agent, or Firm* — Kilpatrick Townsend & Stockton LLP

(57) ABSTRACT

A technique is disclosed for creating a GraphQL Application Programing Interface (API) schema by introspecting various different types of backend datasources. The technique includes receiving a selection of a datasource type to create a GraphQL API schema and introspecting the selected datasource type to determine a set of individual elements associated with the selected datasource type. The technique involves outputting the set of individual elements associated with the selected datasource type via a User Interface (UI) screen of a computer system. The technique further includes receiving a selection of one more individual elements associated with the selected datasource type via a UI screen of the computer system. The technique includes generating a GraphQL API schema comprising a set of objects and a set of resolver functions based on the selected elements and presenting the GraphQL API schema via a UI screen associated with the computer system.

20 Claims, 23 Drawing Sheets

(58) Field of Classification Search
USPC .......................................................... 707/803
See application file for complete search history.

(56) References Cited

U.S. PATENT DOCUMENTS

| | | | | |
|---|---|---|---|---|
| 10,558,671 | B2* | 2/2020 | Tamjidi | G06F 16/212 |
| 11,016,968 | B1* | 5/2021 | Hoover | G10L 15/22 |
| 11,055,282 | B1* | 7/2021 | Fletcher | H04L 67/02 |
| 11,720,532 | B2* | 8/2023 | Tamjidi | G06F 16/2433 |
| | | | | 707/803 |
| 11,734,265 | B1* | 8/2023 | Sagar | G06F 16/252 |
| | | | | 707/759 |
| 11,775,363 | B1* | 10/2023 | Wilton | H04L 67/133 |
| | | | | 719/328 |
| 11,880,726 | B1* | 1/2024 | Ahmadizadeh | G06F 16/2455 |
| 11,886,394 | B2* | 1/2024 | Trocki | G06F 16/2471 |
| 11,914,631 | B2* | 2/2024 | Acharya | G06F 16/2438 |
| 12,182,114 | B1* | 12/2024 | Threlkeld | G06F 16/2448 |
| 2017/0116292 | A1 | 4/2017 | Boehme et al. | |
| 2019/0196890 | A1* | 6/2019 | Bucchi | G06F 16/951 |
| 2019/0340287 | A1* | 11/2019 | Tamjidi | G06F 16/242 |
| 2019/0370370 | A1* | 12/2019 | Wittern | G06F 16/24556 |
| 2019/0392043 | A1* | 12/2019 | Wilson | G06F 8/31 |
| 2020/0004730 | A1* | 1/2020 | Brown | G06F 16/248 |
| 2020/0097559 | A1* | 3/2020 | Wittern | G06F 16/24537 |
| 2020/0226140 | A1* | 7/2020 | Tamjidi | G06F 16/24566 |
| 2020/0311085 | A1* | 10/2020 | Lucas | G06F 16/9024 |
| 2021/0248114 | A1* | 8/2021 | Tamjidi | G06F 16/2433 |
| 2021/0248143 | A1* | 8/2021 | Khillar | G06F 16/2379 |
| 2021/0294679 | A1* | 9/2021 | Thakur | G06F 8/315 |
| 2022/0019400 | A1* | 1/2022 | Law | H04R 5/04 |
| 2022/0092116 | A1* | 3/2022 | Gupta | G06F 16/9024 |
| 2022/0253474 | A1* | 8/2022 | Acharya | G06F 16/2438 |
| 2022/0300351 | A1* | 9/2022 | Phelan | G06F 9/547 |
| 2023/0089365 | A1* | 3/2023 | Manzano | G06F 16/1794 |
| | | | | 707/602 |
| 2023/0138971 | A1* | 5/2023 | Krishnan | G06F 16/9024 |
| | | | | 707/797 |
| 2023/0207069 | A1 | 6/2023 | Cheung | |
| 2023/0222125 | A1* | 7/2023 | Chitimbo | G06F 16/2455 |
| | | | | 707/769 |
| 2023/0252233 | A1* | 8/2023 | Gutierrez | G06F 40/20 |
| | | | | 704/9 |
| 2023/0306021 | A1* | 9/2023 | Chauhan | G06F 16/24534 |
| 2023/0359667 | A1* | 11/2023 | Zionts | G06F 16/9024 |
| 2024/0036910 | A1* | 2/2024 | Stephen | H04L 41/0853 |
| 2024/0037495 | A1* | 2/2024 | Stephen | G06Q 10/087 |
| 2024/0045743 | A1* | 2/2024 | Sagar | G06F 16/27 |
| 2024/0111766 | A1* | 4/2024 | Newman | G06F 16/9024 |
| 2024/0111767 | A1* | 4/2024 | Walraven | G06F 16/212 |
| 2024/0394248 | A1* | 11/2024 | Pilli | G06F 16/2423 |
| 2024/0411759 | A1* | 12/2024 | Pilli | G06F 16/248 |
| 2025/0068626 | A1* | 2/2025 | Tangari | G06F 16/24522 |
| 2025/0094737 | A1* | 3/2025 | Tangari | G06F 40/58 |

OTHER PUBLICATIONS

Autogenerate GraphQL Schemas using the Stepzen Import CLI, StepZen, Available online at: https://stepzen.com/docs/quick-start, 2022, 2 pages.
AWS AppSync, AWS, Available online at: https://aws.amazon.com/appsync/, Accessed from Internet on Dec. 26, 2022, 9 pages.
AWS AppSync Developer Guide, Available online at: https://docs.aws.amazon.com/pdfs/appsync/latest/devguide/appsync-dg.pdf#attaching-a-data-source, 2022, 601 pages.
Connect Databases to Hasura GraphQL Engine, Hasura, Available online at: https://hasura.io/docs/latest/databases/quickstart/, Accessed from Internet on Jan. 31, 2023, 3 pages.
Filtering, ChilliCream, Available online at: https://chillicream.com/docs/hotchocolate/v12/fetching-data/filtering, 13 pages.
GraphQL, Stardog Documentation Latest, Available online at: https://docs.stardog.com/query-stardog/graphql, Accessed from Internet on Dec. 26, 2022, 29 pages.
GraphQL, UI Bakery Docs, Available online at: https://docs.uibakery.io/data-sources/data-sources/graphql, Dec. 26, 2022, 3 pages.
GraphQL Introspection, Hasura, GraphQL Tutorial, Available online at: https://hasura.io/learn/graphql/intro-graphql/introspection/, Accessed from Internet on Dec. 26, 2022, 5 pages.
Hasura GraphQL Engine Documentation, Hasura Inc., Available online at: https://hasura.io/docs/latest/index/, Accessed from Internet on Jan. 31, 2023, pp. 1-4.
Introduction, ChilliCream, Available online at: https://chillicream.com/docs/hotchocolate/v12, Jan. 1, 2023, 1 page.
Overview, ChilliCream, Available online at: https://chillicream.com/docs/hotchocolate/v12/fetching-data, pp. 1-2.
Postgres: Filter Query Results/Search Queries, Hasura, Available online at: https://hasura.io/docs/latest/queries/postgres/query-filters/, Accessed from Internet on Jan. 31, 2023, pp. 1-32.
Postgres: Nested Object Queries, Hasura, Available online at: https://hasura.io/docs/latest/queries/postgres/nested-object-queries/, Accessed from Internet on Jan. 31, 2023, pp. 1-4.
Schema, Hasura, Available online at: https://hasura.io/docs/latest/schema/overview/, Accessed from Internet on Jan. 31, 2023, 1 page.
Schemas, IntelliJ IDEA Documentation, Available online at: https://www.jetbrains.com/help/idea/schemas.html#introspect-system-catalogs-for-a-data-source, Dec. 20, 2022, 12 pages.
Supporting Default Introspection for a GraphQL API, IBM Documentation, Available online at: https://www.ibm.com/docs/en/api-connect/10_reserved_instance?topic=api-supporting-default-introspection-graphql, Dec. 6, 2022, 2 pages.
TIBCO Data Virtualization, User Guide, Available online at: https://docs.tibco.com/pub/tdv/8.0.0/doc/pdf/TIB_tdv_8.0.0_UsersGuide.pdf?id=1, Nov. 9, 2018, 704 pages.
Type-Graphql-Filter, Available online at: https://github.com/kontist/type-graphql-filter, Accessed from Internet on Jan. 31, 2023, 2 pages.
Using Data Sources, Smartbear, Available online at: https://support.smartbear.com/readyapi/docs/testing/data-driven/using.html, 2021, 3 pages.
Using the GraphQL Schema Editor, IBM Documentation, Available online at: https://www.ibm.com/docs/en/api-connect/10_reserved_instance?topic=api-using-graphql-schema-editor, Dec. 6, 2022, 7 pages.
Angele et al., GraphSPARQL a GraphQL Interface for Linked Data, Association for Computing Machinery, Available online at: https://dl.acm.org/doi/pdf/10.1145/3477314.3507655, Apr. 25-29, 2022, pp. 778-785.
Farre et al., GraphQL Schema Generation for Data-Intensive Web APIs, International Conference on Model and Data Engineering, Oct. 28-31, 2019, pp. 184-194.
Mashraki, Automatic GraphQL Filter Generation, Available online at: https://entgo.io/blog/2021/07/01/automatic-graphql-filter-generation/, Jul. 1, 2021, pp. 1-9.
U.S. Appl. No. 18/331,844, Non-Final Office Action mailed on Mar. 3, 2025, 34 pages.
Cheng et al., "LinGBM: A Performance Benchmark for Approaches to Build GraphQL Servers (Extended Version)", Available Online at: "https://liu.diva-portal.org/smash/get/diva2:1697570/FULLTEXT01.pdf", Aug. 9, 2022, 27 pages.

* cited by examiner

| Relational database ⌒ 304 | | | | |
|---|---|---|---|---|
| mkds1 | | | | |
| Resources ⌒ 404 | | | | |
| ○ Search resources | | | | |
| ☑ Tables | | ☑ Column Name | | |
| ☑ COUNTRY | | ☑ □ ID | | |
| ☑ COURSES | | ☑ □ NAME | | |
| ☑ EMPLOYEE | | ☑ □ CITY | | |
| □ MOVIES | | □ □ PIN | | |
| □ STATE | | □ □ GRADUATION | | |
| □ STUDENTS | | □ □ ADMITTED | | |
| 3 Selected | Showing 6 Items <1 of 1> | ☑ □ STUDENT_IDCARD_NUMBER | | |
| | | 5 Selected | Showing 7 Items <1 of 1> | |
| | | ☑ Operations | | |
| | | ☑ ○ CREATE | Create employee | |
| | | ☑ ○ UPDATE | Update employee | |
| | | □ ● DELETE | Delete employee | |
| | | ☑ ○ QUERY | Find employee information | |
| | | 3 Selected | | Showing 4 Items |
| Generate Schema   Cancel | | | | |

502 → 
504 → COUNTRY
506 → COURSES
508 → EMPLOYEE
308 →

FIG. 5

```
 1▼ type Country {
 2      countryname: String
 3      pin: ID!
 4   }
 5
 6▼ type Courses {
 7      codename: String
 8      credits: String
 9      id: ID!
10      name: String
11      strength: String
12   }
13
14▼ type Employee {
15      city: String
16      id: ID!
17      name: String
18      pin: String
19      student_Idcard_Number: String
20   }
```

FIG. 9

Generate Schema

☐ ● GET /phones

Parameters ⎫ 1404

| Field Name | |
|---|---|
| | No items found |

⁂ Show input reference objects

Response:  Array of Phone objects
1406      ⁂ Show output reference objects

| Field Name | |
|---|---|
| App | |
| Phone | |

☐ ● GET /phones/{id}
☐ ● GET /accessories

[Generate Schema] [Cancel]

---

Select fields ⌒ 1408

Schema Type
Phone

| | Field Name | Type |
|---|---|---|
| ☐ | id | String |
| ☑ | os | String |
| ☑ | make | String |
| ☑ | model | String |
| ☐ | display_name | String |
| | accessories | Array of String objects |
| ☑ | apps | Array of App objects |
| | 5 Selected | Showing 7 Items |

[Generate Selection] [Cancel]
↳ 1410

| Validate | Save Schema | Generate Schema | Actions ▼ | ↶ | ↷ | 🔍 Search |

1602

5. }
6. type Students {
7.   id: ID!
    name: String!
    phone: Phones
    phone_id: 10
    classes : [Classes]
    address_city: String
    address_pin : String
    graduation : Date
} type Phones {                                                    Edit resolver  1604
    id: 101
    name: String!
    type: PhoneType!
    manufacturer_name: String!
    manufacturer_id: 101
    accessories: Accessories
}
type Query {
    getStudents( id : Int! ) : Students
    listStudents( filters : StudentInputFilter, distinctOn: Boolean, sortBy : StudentsSortInputFilter, pagination: PaginationInput) : [Students]
    studentsAggregation( filters : StudentsInputFilter, aggregation : AggregationInput, distinctOn: Boolean ) : Float

```
}
type Phones {
```

Datasource
[REST_API ⇅]

Resource
[http://localhost:8080/mock/rest/phones/]

Resource Path *Optional*
http://localhost:8080/mock  [/rest/phones/]

▾ Relationships                                          ✕
Datasource       ⤴1804
[Select a secondary data source ⇅]

Resource path *Optional*
[                                                          ]

▾ Parameters ⌒ 1806
| Paramiter type ⓘ | Paramiter type ⓘ | Argument field *Optional* | ✕ |
|---|---|---|---|
| [Query ⇅] | [id ⇅] | [filters.phone_id] | |

⋮≡ Hide advanced options
Multiple values ⓘ
[comma-delimited ⇅]

[+ Another Parameter]

Template
[.items ⇅]

[+ Another Query]

▾ Fields
| Field name | Resource path *Optional* | Resource ID | | | |
|---|---|---|---|---|---|
| [id] | [String ⇅] | [id] | ☑ Required ⓘ | ☑ Unique ID ⓘ | ✕ |

[+ Another Query]

Version
[id]

FIG. 18

DATASOURCE INTROSPECTION USER INTERFACE FOR GRAPHQL API SCHEMA AND RESOLVER GENERATION

BACKGROUND

GraphQL is a web-based query language specification for APIs (Application Programing Interfaces) in which a client can define the structure of the data to be returned by a server. Using GraphQL, instead of making multiple requests to different endpoints to fetch different pieces of data, a client can make a single request to the GraphQL API and specify exactly what data it needs. GraphQL allows for more precise and efficient data fetching, reduces over-fetching and under-fetching of data, and enables clients to request only the data they need, which can improve network performance and reduce network overhead.

GraphQL uses a predefined schema that describes the data that can be queried and the types of data that can be fetched from various backend data sources. A GraphQL API schema generally defines object types with fields and a set of operations that represent the data that can be retrieved from a GraphQL API from the backend data sources. A GraphQL schema is generally defined using a specification such as a Schema Definition Language (SDL) which describes the object types, the fields of the object types, and their relationships. A GraphQL server uses a GraphQL API schema and a set of resolver functions (collection of functions that are responsible for resolving (returning) the data for fields in the schema) to parse an incoming query request from an end user, identify the query operation to execute, execute the operation against one or more backend data sources and return the results of the operation to an end user.

Typically, as part of developing a GraphQL API, a user (e.g., GraphQL API developer) writes a GraphQL schema comprising a set of object types, fields and queries that the GraphQL API is allowed to execute. The API developer additionally writes the code or logic that describes how the object types of the schema map to resolvers and the logic for fetching or modifying the data from the various backend data sources. In some instances, the developer may additionally write code to define custom types and fields that map to the data model of their application via the schema. The process of writing a GraphQL API schema is generally a time consuming task for the API developer requiring considerable manual effort on the part of the developer to accurately describe the schema to define the object types and object fields that represent data that can be retrieved from the API as well as the group of operations that the API is allowed to execute in the schema. There is thus a need for developing techniques that facilitate more efficient GraphQL API development than what is possible by existing implementations.

BRIEF SUMMARY

The present disclosure relates generally to techniques for creating a GraphQL Application Programing Interface (API) schema. More specifically, but not by way of limitation, this disclosure describes techniques for creating a GraphQL API schema by introspecting various types of backend datasources. In certain examples, the introspection is facilitated using introspection screens that provide users with the ability to select and introspect a backend datasource and to select individual elements of the backend datasource to be included in a GraphQL API schema. Using the disclosed introspection technique, users can easily create a GraphQL API schema without having to explicitly define a schema using a schema specification language or without having to know how the data is fetched from the backend data sources.

In certain embodiments, a GraphQL Application Programing Interface (API) schema design system for creating a GraphQL API schema is disclosed. The system receives a selection of a datasource type to create a GraphQL Application Programing Interface (API) schema. The system introspects the selected datasource type to determine a set of individual elements associated with the selected datasource type. The system then outputs the set of individual elements associated with the selected datasource type via a set of one or more User Interface (UI) screens associated with the computer system.

In certain examples, the system receives a selection of one or more individual elements associated with the selected datasource type via the set of one or more UI screens. Upon receiving the selection of the individual elements, the system generates a GraphQL API schema for the selected datasource type. The GraphQL API schema comprises a set of object types and a set of resolver functions associated with the object types. The system then provides the GraphQL schema and the set of resolver functions, via the set of one or more UI screens associated with the system.

In certain examples, the selected datasource type is a relational database and the system introspects the relational database to determine a set of individual elements associated with the relational database. In certain examples, the set of individual elements associated with the relational database comprise a set of one or more tables within the relational database, a set of one or more columns associated with the set of tables and a set of one or more operations supported by the set of tables and the set of columns.

In certain examples, the system outputs a set of tables associated with a relational database and a set of columns associated with the set of tables via the set of UI screens. In certain examples, the system receives a selection of one or more tables associated with a relational database, a selection of one or more columns associated with the tables and a selection of one or more operations supported by the tables via the set of UI screens. In certain examples, based on the selections, the system generates a GraphQL schema for the relational database.

In certain examples, the selected datasource type is a Representational State Transfer (REST) Application Programing Interface (API) datasource and the system introspects the REST API datasource to determine a set of individual elements associated with the REST API datasource. In certain examples, the set of individual elements associated with the REST API datasource comprise a set of one APIs associated with the REST API datasource, query parameters associated with the APIs and response information associated with the APIs. In certain examples, the system receives a selection of one or more APIs associated with a REST API datasource, wherein the selected datasource type is the REST API datasource.

In certain examples, the system receives selection of an object type from the set of object types defined in the GraphQL API schema via the set of UI screens and receives an indication to edit a resolver function associated with the selected object type. The system then presents structural information associated with the selected object type via the UI screens. In certain examples, the system receives a modification to the structural information associated with the selected object type and based on the modification, edits, the resolver function associated with the selected object type. The system then publishes a modified GraphQL API schema via the set of UI screens.

BRIEF DESCRIPTION OF THE DRAWINGS

Features, embodiments, and advantages of the present disclosure are better understood when the following Detailed Description is read with reference to the accompanying drawings.

FIG. 5 depicts an example of a graphical user interface (GUI) for selecting one or more elements associated with a selected datasource type, according to certain embodiments.

FIG. 9 depicts an example of a graphical user interface (GUI) for selecting an object type defined in a GraphQL schema, according to certain embodiments.

FIG. 14 depicts an example of a graphical user interface (GUI) that presents REST API specification information related to a REST API, according to certain embodiments.

FIG. 16 depicts an example of a graphical user interface (GUI) that presents additional details of the GraphQL API schema shown in FIG. 15 that is created by introspecting a REST datasource, according to certain embodiments.

FIG. 17 depicts an example of a graphical user interface for editing a resolver function associated with a REST object, according to certain embodiments.

FIG. 18 depicts another example of a graphical user interface for editing a resolver function associated with a REST object, according to certain embodiments.

DETAILED DESCRIPTION

Figure 1:
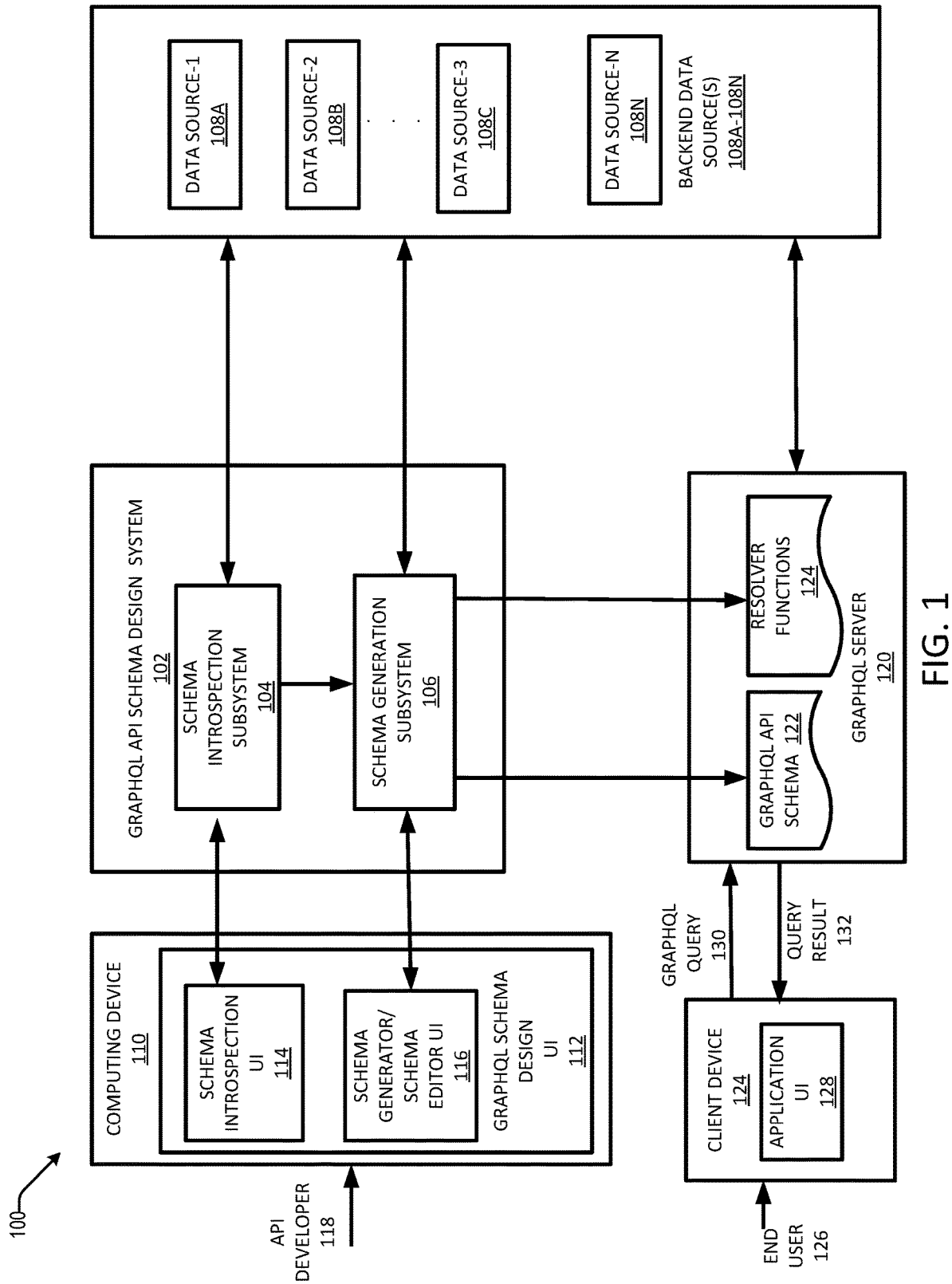
FIG. 1 depicts an example of a computing environment that includes a GraphQL Application Programing Interface (API) schema design system for creating a GraphQL API schema, according to certain embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

As previously described, GraphQL API development traditionally involves a user (e.g., an API developer) having to explicitly create a GraphQL API schema to define object types, object fields and the operations that represent the data that can be retrieved from a GraphQL API from various backend data sources. This is generally a time consuming process for an API developer requiring considerable manual effort on the part of the developer to accurately define the object types and object fields that represent data that can be retrieved from the API using a schema definition language. Certain approaches used by existing GraphQL API development techniques perform introspection (or inspection) of the datasources to determine structural information associated with the datasources to enable faster GraphQL API development. However, existing introspection techniques do not allow developers to intricately choose the objects and the fields in those objects along with the operations allowed on them during the GraphQL API development process. Also, existing techniques that may perform introspection do not have capabilities to introspect different types of backend datasources, such as for instance, relational databases, Representational State Transfer (REST) API datasources and so on.

The present disclosure addresses several deficiencies of systems that perform GraphQL API development. A GraphQL Application Programing Interface (API) schema design system is disclosed that enables the creation of a GraphQL API schema by introspecting various types of backend datasources. The backend datasources may include, but are not limited to, relational databases, REST APIs, graph databases, micro-services, web services and so on. In certain examples, the introspection is facilitated using a set of introspection User Interface (UI) screens that provide users with the ability to select and introspect a backend datasource and to select individual elements of the datasource to be included in the creation of a GraphQL API schema. Using the introspection UI screens provided by the disclosed system, users can easily create a GraphQL API schema without having to explicitly define a schema using a schema specification language.

In certain embodiments, after generating a GraphQL API schema using introspection as described above, the disclosed system additionally includes capabilities to create/generate a set of resolver functions to fetch data for object fields defined in the GraphQL API schema from different backend datasources. As previously described, a resolver function is used for resolving (returning) data for an object field defined a GraphQL API schema and populates the data for the object field in the GraphQL API schema. In a certain implementation, the disclosed system generates resolver functions by generating resolver metadata to fetch data (i.e., resolve a value) for the object field from various backend sources. By using the disclosed system, a user can easily create a GraphQL API schema using introspection without having knowledge of any particular schema specification language (e.g., SDL)) to explicitly define a schema or without explicitly having to write the code/logic to create resolver functions for the object types defined in the schema. The datasource introspection UI based, metadata driven, codeless implementation provided by the disclosed system to generate a schema enables even non-developers (e.g., novice users) to be able to easily create GraphQL APIs without having to explicitly write a GraphQL API schema using a SDL, without knowing details of how schema maps to resolvers and without knowing details of how the data is fetched from the data sources.

In certain examples, the disclosed system includes capabilities to perform database introspection. The database introspection not only allows the selection of individual database tables as schema objects but also the selection of individual columns of a table as fields of schema objects represented in a GraphQL API schema as well as operations allowed on the schema objects. The system additionally includes capabilities to perform REST API introspection, where users can inspect (i.e., introspect) an open API specification of a REST API datasource and choose APIs and resources with the needed fields that need to be exposed as objects and operations in the GraphQL schema. Thus, a user of the system is able to create objects from a combination of backend datasources such as relational databases, REST API datasources (REST services) and so on and make the objects available for querying in a GraphQL schema.

FIG. 1 depicts an example of a computing environment 100 that includes a GraphQL Application Programing Interface (API) schema design system 102 for creating a GraphQL API schema, according to certain embodiments. Processing related to creating a GraphQL API schema may be performed by one or more subsystems (e.g., the schema introspection subsystem 104 and the schema generation subsystem 106) within the GraphQL schema design system 102. The systems and subsystems of the system 102 depicted in FIG. 1 may be implemented using software (e.g., code, instructions, program) executed by one or more processing units (e.g., processors, cores), hardware, or combinations thereof. The software may be stored on a non-transitory storage medium (e.g., on a memory device).

The system 102 may be implemented in various different configurations. In certain embodiments, the system 102 may be implemented within an enterprise (e.g., an organization) servicing users of the enterprise. For instance, users of an enterprise may utilize the functionality of the system 102 to create a GraphQL API schema using datasource introspection and create resolver functions for object types and object fields represented in the schema. In some other embodiments, the system 102 may be implemented on one or more servers of a cloud service provider (CSP) and its schema and resolver function creation functionality may be provided to subscribers (e.g., an organization or an enterprise) who subscribe to cloud services on a subscription basis.

The computing environment 100 additionally includes a GraphQL server 120 for executing GraphQL queries against a GraphQL API schema generated by the GraphQL API schema design system 102 to retrieve data from one or more backend datasources. The backend datasources (108A-108N) may include, but are not limited to, relational databases, REST APIs, graph databases, micro-services, web services and so on. The GraphQL server 120 may be implemented in various different configurations. In certain embodiments, the GraphQL server 120 may be implemented within the enterprise (organization) servicing users of the enterprise. For instance, users of an enterprise may utilize the functionality of the GraphQL server to execute queries against a GraphQL API schema generated by the GraphQL API schema design system 102. In other embodiments, the GraphQL server 120 may be implemented on a cloud service provider (CSP) and its query execution functionality may be provided to subscribers (e.g., an organization or an enterprise) who subscribe to cloud services on a subscription basis.

The computing environment 100 depicted in FIG. 1 is merely an example and is not intended to unduly limit the scope of claimed embodiments. One of ordinary skill in the art would recognize many possible variations, alternatives, and modifications. For example, in some implementations, the GraphQL API schema design system 102 and the GraphQL server 120 can be implemented using more or fewer subsystems than those shown in FIG. 1, may combine two or more subsystems, or may have a different configuration or arrangement of subsystems.

In certain embodiments, the processing related to creating/generating a GraphQL schema is performed by one or more subsystems (104, 106) of the GraphQL API schema design system 102. The processing first involves, introspecting, by the schema introspection subsystem 104, a type of backend datasource to determine structural information (i.e., a set of individual elements) associated with the backend datasource. For instance, the introspection of a backend datasource such as a database, involves determining, by the schema introspection system, individual elements associated with the database such as the tables, columns, and a set of operations that can be supported by the tables and the columns within the database. In a certain implementation, the introspection is facilitated using one or more datasource introspection User Interface (UI) screens of the schema introspection subsystem 104. Using the datasource introspection screens, a user (e.g., an API developer 118) of the system 102 can select a type of datasource to introspect and select individual elements associated with the selected datasource to introspect. For instance, for a datasource type that represents a database, a user may select tables within the database, select individual columns of the table as well as select operations that can be performed on the selected tables and/or selected columns of the table using the datasource introspection screens.

Once introspection is complete, the schema generation subsystem 106 creates (or generates) a GraphQL API schema based on the selected elements associated with the selected datasource type. For instance, for a database, the schema generation subsystem 106 represents (or exposes) the selected tables of the database as a set of object types in the GraphQL API schema, the selected columns associated with the selected tables as a set of object fields associated with the set of object types and the selected operations as queries or mutations that are supported by the object types in the GraphQL API schema. The schema generation subsystem additionally creates resolver functions for the objects, object fields and/or operations defined in the GraphQL API schema. Details of the processing performed by the schema generation subsystem 106 to generate a schema and generate resolver functions for the objects defined in the schema is described in detail below.

In certain examples, a user (e.g., an API developer 118) of the system 102 may interact with the system 102 using a GraphQL schema design UI 112 associated with the GraphQL schema design system 102 to create a GraphQL API schema. As depicted in FIG. 1, the GraphQL schema design UI may be displayed via a computing device 110 that is communicatively coupled to the system 102, possibly via one or more communication networks. The computing device 110 may be of various types, including but not limited to, a mobile phone, a tablet, a desktop computer, and the like. The GraphQL schema design UI 112 may be composed of one more UIs such as a schema introspection UI 114 and a schema generator/schema editor UI 116. Using the schema introspection UI 114, an API developer 118 can select elements associated with a particular datasource type. For example, for a datasource type that represents a relational database, the schema introspection UI 114 displays the tables, columns and the operations that can be executed on those tables and columns and further provides a developer with the ability to pick and choose the relevant tables and their columns as GraphQL schema objects and schema fields along with the operations that can be executed on those objects.

Once introspection is complete, the schema generation subsystem 106 generates the GraphQL schema, and the schema is published and presented to the API developer via the schema generator/editor UI 116. In certain examples, the API developer 118 may further use the Schema Generator/schema Editor UI to modify the generated schema and the resolver functions that are responsible for resolving (returning) the data for object fields defined in the schema. Details related to the processing performed by the various systems and subsystems in FIG. 1 as well as details related to the functionality provided by the schema introspection UI 114 and the schema generator/schema editor UI 116 are described below with respect to the flowchart depicted in FIG. 2 and its accompanying description.

The published GraphQL API schema 122 and the resolver functions 124 may be provided to a GraphQL server 120 for processing. As depicted in FIG. 1, the GraphQL server 120 receives a GraphQL query 130 from an end user 126 and executes the GraphQL query against the GraphQL API schema 122 and the resolver functions 124 to retrieve results for the end user. The end user (e.g., 128) may be an API developer or a non-API developer of an entity (e.g., organization) that implements the functionality provided by the systems 102 and 120. In certain examples, the end user 126 may utilize an application UI 128 associated with a client device 124 to submit a GraphQL query 130. The system 120 checks the query 130 against the GraphQL API schema 122 and the resolver functions 124 to ensure that the query refers to the types and fields defined in the schema and then executes the query against one or more backend datasources (108A-108N) to produce a query result. The query result 132 is provided to the end user via the application UI of the device 124.

Using the introspection UIs and the schema generator UIs provided by the system 120, a user can easily create a GraphQL API schema without having knowledge of any particular schema specification language (e.g., SDL)) to explicitly define a schema and to explicitly write the code/logic to create resolver functions for the object types defined in the schema. Non-API developers (e.g., novice users) can also create a GraphQL API using the introspection techniques provided by the system 102 without having to know the details of how a schema maps to the resolvers and how the data is fetched from the backend datasources.

The disclosed system additionally provides users with the ability to introspect different types of backend datasources, including, but not limited to, relational databases, REST APIs, graph databases, micro-services, web services and so on. The database introspection not only allows selection of individual database tables as schema objects but also the selection of individual columns of a table as fields of schema objects represented in a GraphQL API schema as well as operations allowed on the schema objects. The system additionally includes capabilities to perform REST API introspection, where users can inspect (i.e., introspect) an open API specification of a REST service and choose APIs and resources with the needed fields that need to be exposed as objects and operations in the GraphQL schema. Thus, a user of the system 102 is able to create objects from a combination of backend datasources such as relational databases, REST services and so on and make the objects available for querying in a GraphQL schema.

Figure 2:
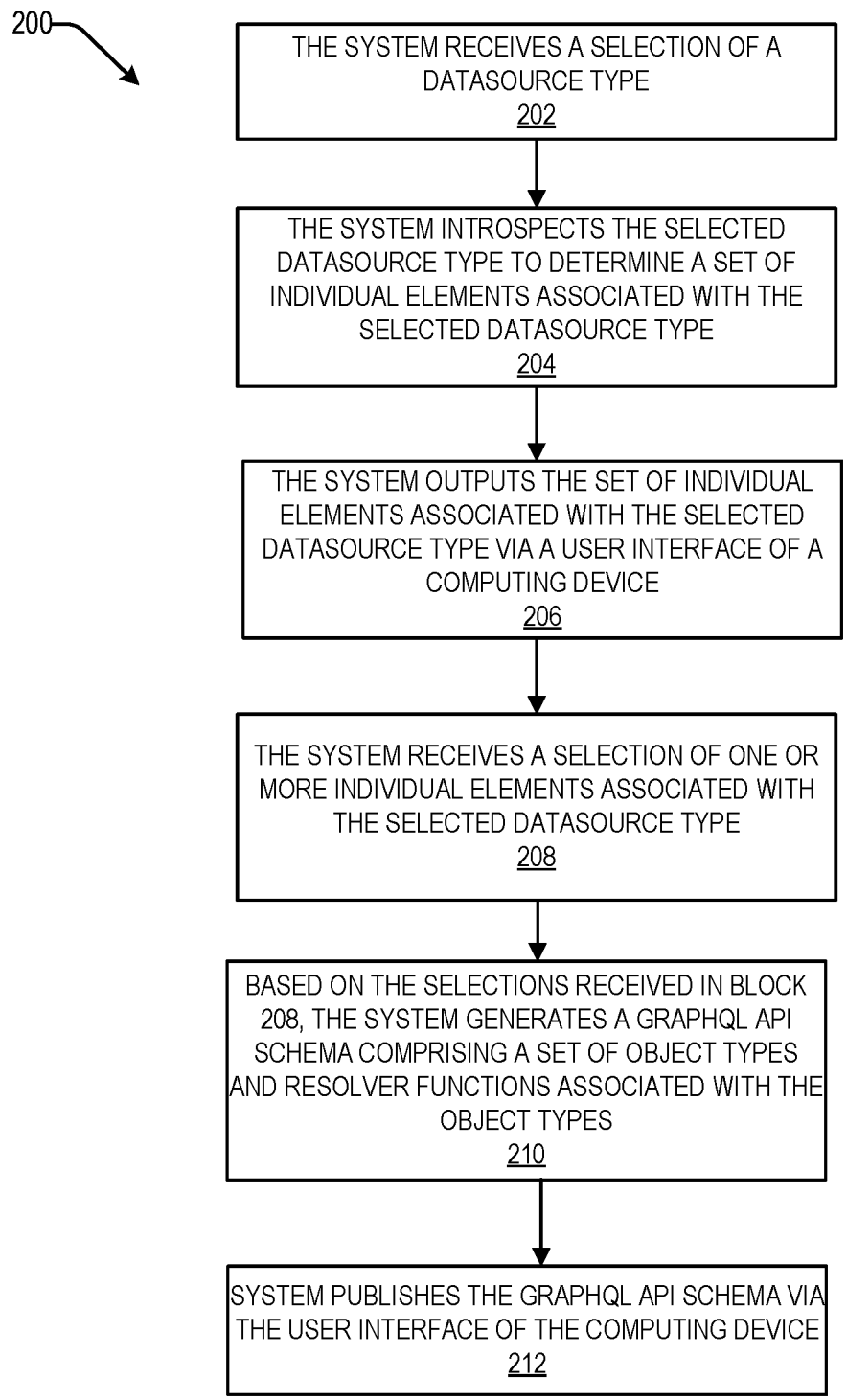
FIG. 2 depicts an example of a process for generating a GraphQL API schema, according to certain embodiments.

FIG. 2 depicts an example of a process 200 for generating a GraphQL API schema, according to certain embodiments. The processing depicted in FIG. 2 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 200 presented in FIG. 2 and described below is intended to be illustrative and non-limiting. Although FIG. 2 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 2 may be performed by the schema introspection subsystem 104 and the schema generation subsystem 106 of the GraphQL API schema design system 102.

At 202, processing is initiated when the schema introspection subsystem 104 receives a selection of a datasource type from a user (e.g., an API developer 118 shown in FIG. 1) of the system 102 to create a GraphQL API schema. For example, in the embodiment depicted in FIG. 1, the API developer 118 may select a particular datasource type via the schema introspection UI 114 of the computing device 110. The types of datasources that may be selected may include, but are not limited to, relational databases, REST APIs, graph databases, micro-services, web services and so on. An example of a schema introspection UI for selecting a datasource type is shown in FIG. 3.

Figure 3:
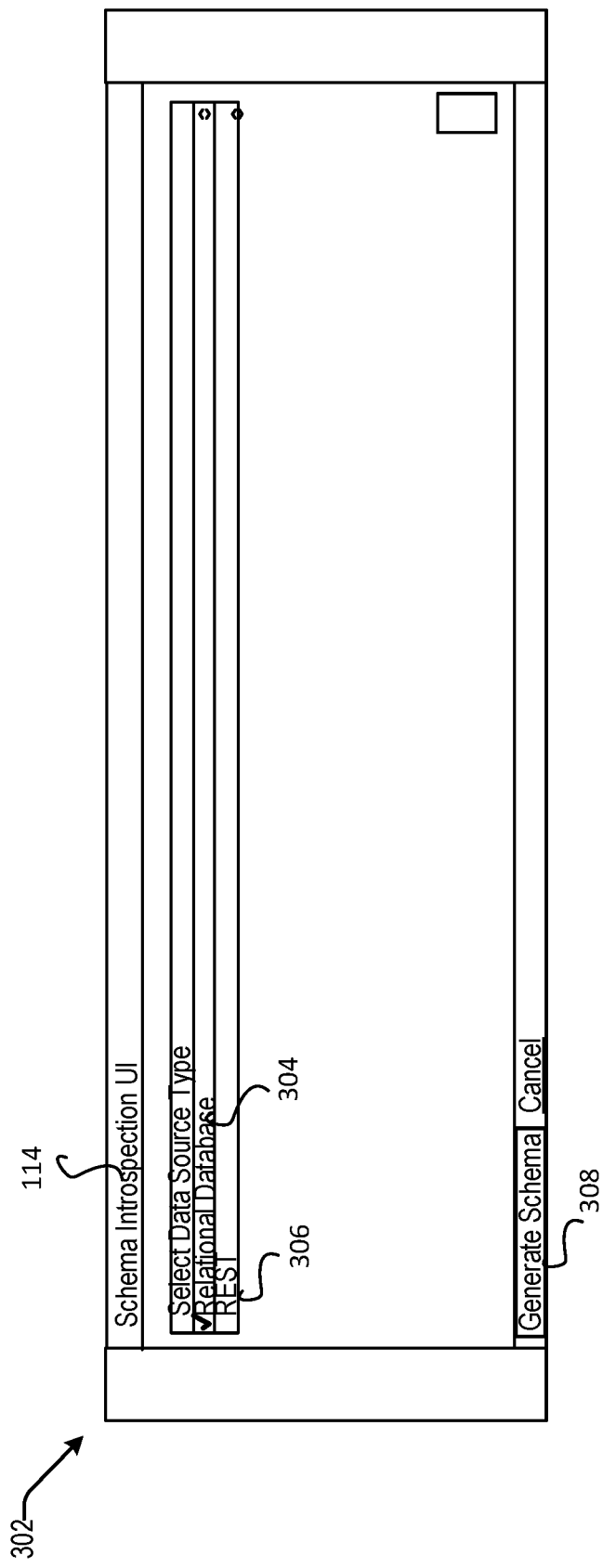
FIG. 3 depicts an example of a graphical user interface (GUI) for selecting a datasource type, according to certain embodiments.

FIG. 3 depicts an example of a graphical user interface (GUI) 302 for selecting a datasource type, according to certain embodiments. In certain examples, the GUI 302 may be a UI component of the schema introspection UI 114 that is provided to an API developer (e.g., 118) as part of the schema introspection workflow. As shown in FIG. 3, in certain examples, an API developer may select a particular datasource type (e.g., a Relational Database 304) via the UI to create a GraphQL API schema. In other examples, the API developer may select a different datasource type (e.g., a REST datasource 306) via the GUI 302. After selecting a particular datasource type via the GUI 302 depicted in FIG. 3, the API developer may select the "generate schema" button 306 to execute the select operation.

At block 204, the schema introspection system 104 introspects the selected datasource type to determine a set of individual elements associated with the selected datasource type. By way of example, the individual elements for a datasource type that is a database, may include, for instance, tables and columns associated with the database and a set of operations that can be performed on the tables and columns.

At block 206, the schema introspection system 104 outputs the individual elements associated with the selected datasource type via a UI of a computing device. For example, in the embodiment depicted in FIG. 1, the elements associated with a selected datasource type may be output/displayed to the API developer 118 via the schema introspection UI 114 of the computing device 110. An example of a UI for outputting individual elements associated with a selected datasource type is shown in FIG. 4.

Figure 4:
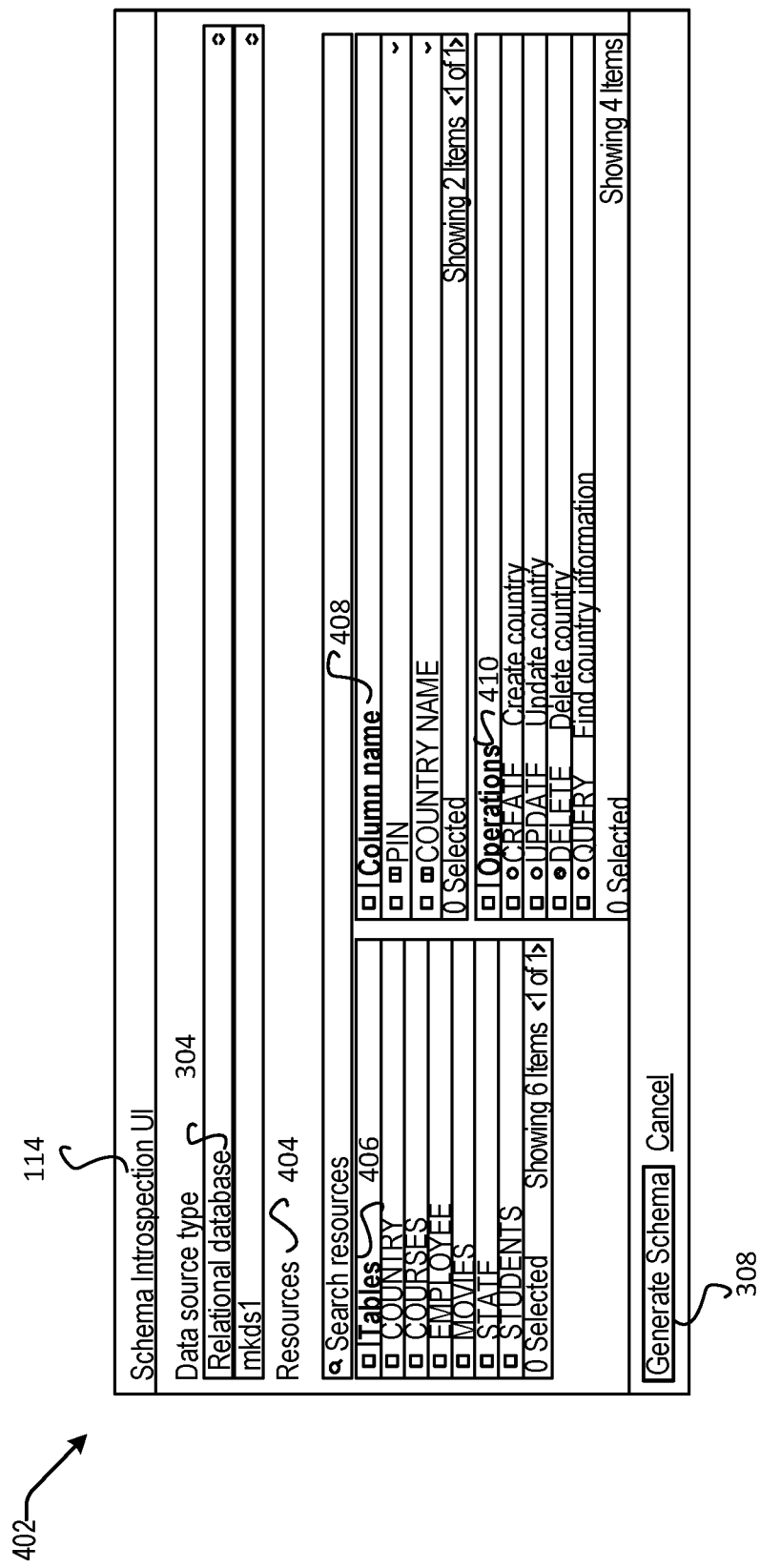
FIG. 4 depicts an example of a graphical user interface (GUI) for outputting individual elements associated with a selected datasource type, according to certain embodiments.

FIG. 4 depicts an example of a graphical user interface (GUI) 402 for outputting individual elements associated with a selected datasource type, according to certain embodiments. In certain examples, the GUI 402 may be provided as a UI component of the schema introspection UI to an API developer (e.g., 118) as part of the schema introspection workflow. As shown in FIG. 4, the individual elements (also referred to herein as "resources" 404 in FIG. 4) associated with a selected datasource type (i.e., relational database "mkds1" 304) comprises a set of tables 406 within the database, for a table, a set of columns 408 of the table and a set of operations 410 that can be supported by the table and/or the columns of the table. In the illustrated example, the UI 402 displays a set of columns (e.g., a pin, country name) and a set of Create, Read, Update and Query operations (e.g., create country, update country, delete country, find country information) that can be supported by a particular table (e.g., country) selected by the API developer. In other examples, based on the developer's selection, the UI 404 may display columns associated with another table (e.g., courses, employee, movies, state or student) of the relational database via the GUI 402 and a set of operations supported by that table.

At block 208, the schema introspection subsystem 104 receives a selection of one or more individual elements associated with the selected datasource type. For instance, the selected elements for a relational database may include, for instance, one or more tables of the database, one or more columns associated with a selected table of the database and/or one or more operations that can be supported by the selected table and/or one or more selected columns of the table. For example, in the embodiment depicted in FIG. 1, the elements associated with a selected datasource type may be selected by the API developer 118 via the schema introspection UI 114 of the computing device 110. An example of a UI for selecting elements associated with a selected datasource type is shown in FIG. 5.

FIG. 5 depicts an example of a graphical user interface (GUI) 502 for selecting one or more elements associated with a selected datasource type, according to certain embodiments. In certain examples, the GUI 502 may be presented as a UI component of the schema introspection UI to an API developer (e.g., 118) as part of the schema introspection workflow. As shown in FIG. 5, the selectable elements (i.e., resources) associated with a selected datasource type (i.e., relational database 304) may include a set of tables within the relational database that can be selected, for each selected table, the columns of the table that can be selected and a set of selectable operations that are supported by the table and/or the columns of the table. The UI 502 shown in FIG. 5 illustrates that three tables, country 504, courses 506 and employee 508 of the relational database 304 "mkDS1" have been selected. In other examples, a different set of one or more tables of the relational database may be selected. The UI 502 additionally displays a set of columns for a selected table and a set of operations that are supported by the selected table. Once all selections have been made for all the selected tables, the API developer may select the "Generate Schema" button 308 to execute the selections.

In block 210, the system generates a GraphQL API schema based on the selections received in block 208. In certain examples, such as in the embodiment depicted in FIG. 1, the schema generation subsystem 106 generates the GraphQL API schema based on the selected elements associated with the selected datasource type. For instance, as previously described, for a database, the selected elements may include selected tables, selected columns within the selected tables and one or more selected operations supported by the selected tables. To generate a GraphQL API schema for a database datasource type, the schema generation subsystem 106 represents (or exposes) the selected tables as a set of object types in the GraphQL API schema, the selected columns associated with the selected tables as a set of object fields associated with the set of object types and the selected operations as queries or mutations that are supported by the object types represented in the GraphQL API schema. Once the GraphQL schema is generated, the schema generation subsystem 106 additionally generates the resolver functions for the objects, object fields and/or operations defined in the schema. In certain examples, such as in the embodiment depicted in FIG. 1, the GraphQL API schema may be displayed via a schema generator/schema editor 116 of the computing device 110.

Figure 6:
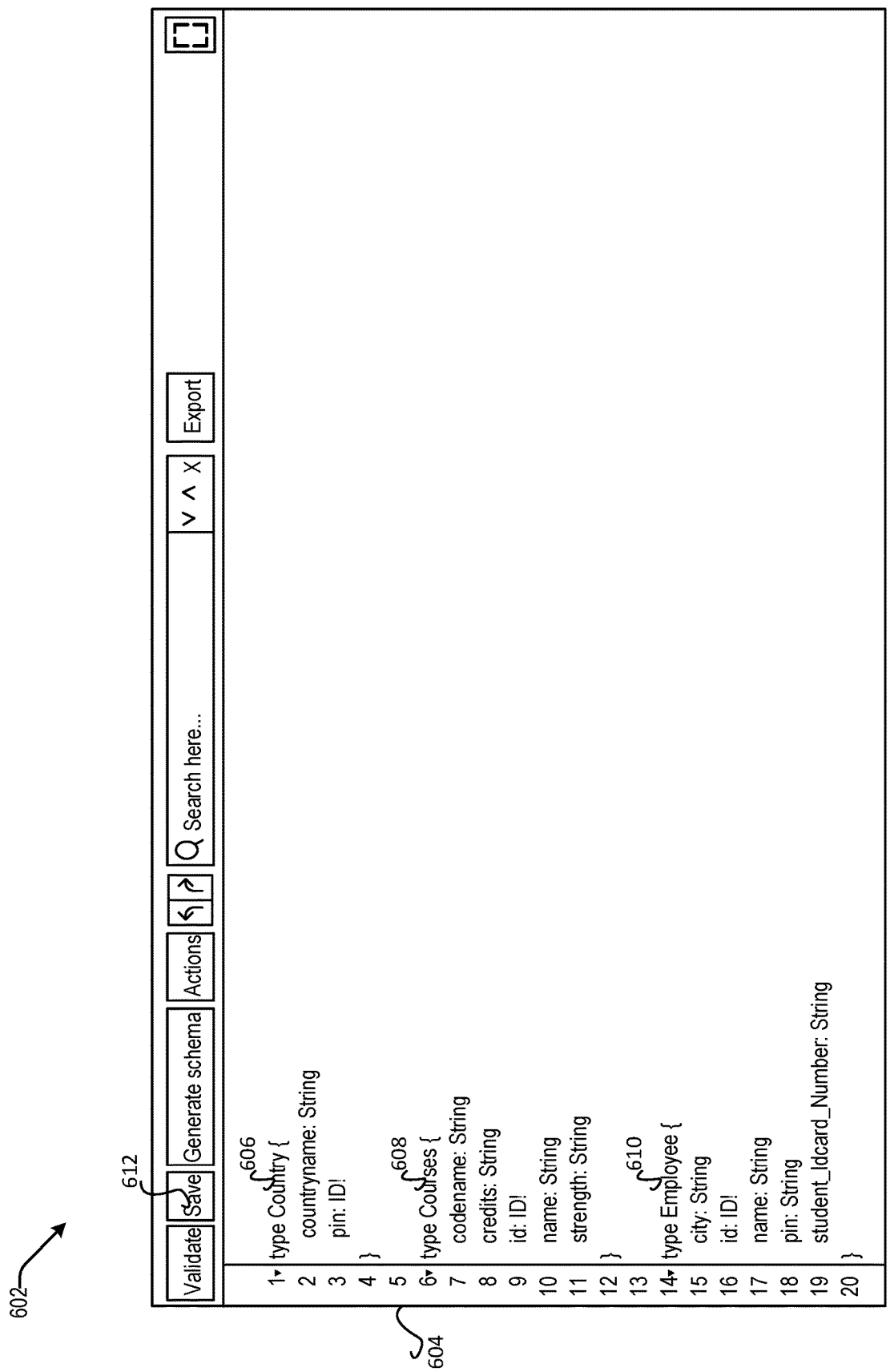
FIG. 6 depicts an example of a graphical user interface (GUI) for presenting a GraphQL API schema, according to certain embodiments.

FIG. 6 depicts an example of a graphical user interface (GUI) 602 for presenting a GraphQL API schema, according to certain embodiments. In certain examples, the GUI 602 may be a UI component of the schema generator/schema editor UI 116 and presented to a user (e.g., an API developer) of the system 102 as part of the schema generation workflow performed by the schema generation subsystem 106. As shown in FIG. 6, the GraphQL API schema 604 comprises a set of object types (country type 606, courses type 608 and employee type 610) and a set of object fields associated with the set of object types. The "country" object type 606 in the schema 604 is generated based on the "country" table 504 selected via the GUI 502 shown in FIG. 5 and the set of object fields of the "country" object type are generated based on the columns ("countryname" and "pin") of the "country" table that were selected via the GUI 502. Similarly, the "courses" object type 608 in the schema 604 is generated based on the "courses" table 506 selected via the GUI 502 and the set of object fields of the "courses" object type are generated based on a set of columns of the table 506 that were selected via the GUI 502. The "employee" object type 610 in the schema 604 is generated based on the "employee" table 508 selected via the GUI 502 and the set of object fields of the "employee" object type are generated based on a set of columns of the table 508 that were selected via the GUI 502.

Figure 7:
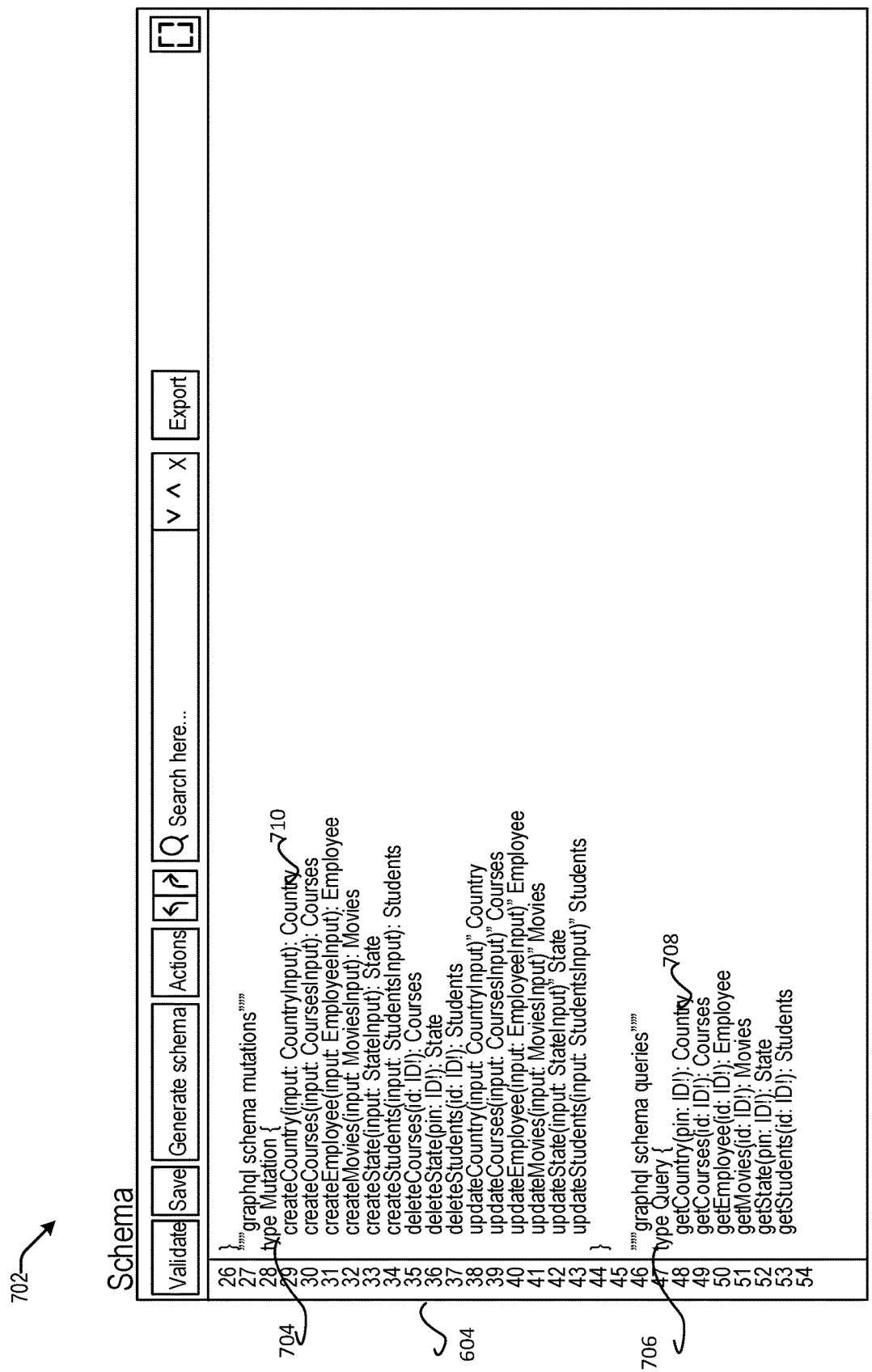
FIG. 7 depicts an example of a graphical user interface (GUI) comprising GraphQL mutation types and GraphQL query types defined in a GraphQL API schema, according to certain embodiments.

In certain examples, the GraphQL API schema 604 may be composed of additional object types (e.g., Query types, Mutation types) that represent a set of operations (e.g., queries and mutations) that can be supported by one or more object types (e.g., 606, 608 or 610) defined in the GraphQL API schema. FIG. 7 depicts an example of a graphical user interface (GUI) 702 comprising GraphQL mutation types and GraphQL query types defined in a GraphQL API schema, according to certain embodiments. In certain examples, the GUI 702 may be a UI component of the schema generator/schema editor UI 116 and presented to an API developer (e.g., 118) as part of the schema generation workflow performed by the schema generation subsystem 106. A GraphQL query type 706 is used to represent a set of operations in a GraphQL schema 604 that can be sent to a GraphQL server to fetch data from one or more backend data sources. For example, in the example shown in FIG. 7, "getCountry(pin: ID!) Country" 708 is a query type operation defined in the GraphQL API schema that is used to fetch a pin code associated with the country object type from a backend datasource. A GraphQL mutation type 704 represents a set of operations that can be sent to a GraphQL server to modify (create, update or delete) data at the backend data sources. For instance, createCountry (input: CountryInput): Country 710 is a mutation type operation defined in the GraphQL API schema that can be used to create a new country object type.

After a GraphQL API schema has been generated with object types, query types and mutation types, as described above, as part of the schema generation workflow, the schema generation subsystem 106 additionally includes capabilities to create/generate a set of resolver functions to fetch data for the object fields associated with different schema types (object, query or mutation) defined in the schema from various different backend datasources. A resolver function populates data for a particular object field in a GraphQL API schema. In a certain implementation, the generation of a resolver function for an object field defined in the schema, involves, generating, by the schema generation subsystem 106 the resolver metadata to fetch data (i.e., resolve a value) for the object field from various backend sources. The resolver metadata may include, for example, the return value of the object field to be fetched from the backend datasource, the arguments provided for the object field, information pertaining to the data type to be returned, context information regarding the object type associated with the object field, information regarding query/mutation operations defined by the object field and so on.

In certain examples, the resolver metadata for a resolver function may comprise resolver configuration details associated with a schema object. The example shown below illustrates resolver configuration details associated with an employee object 610 shown in FIG. 6.

```
"key" : "Employee",
  "commonResolverConfigurationDetails" : {
    "configType" : "RDBMS_OBJECT",
    "typeName" : "Employee",
    "dataSource" : "mkds1",
    "cacheEnabled" : "ENABLED",
    "cacheTtlInSec" : 1,
    "objectCommonResolverProperties" : {
       "primaryTable" : "EMPLOYEE",
       "tableJoins" : [ ]
}
```

As previously described, the backend datasources may be any database (e.g., SQL, no-SQL), a REST API, a graph database, a micro-service, a web service, and so on that stores or provides the data to populate the schema's object fields. For instance, referring to the GraphQL API schema 604 shown in FIG. 6, the schema generation subsystem 106 may create a resolver function to retrieve a pin code (object field) for a country (object type), to obtain an employee id for an employee, to obtain a course id for a course and so on. A resolver function returns data from a particular backend datasource of the type required by the resolver's corresponding schema object field (e.g., a string, an integer, an object etc.). In certain instances, a resolver function for a first schema object field (e.g., employee id) associated with a schema object type (e.g., employee) defined in the schema may fetch data from a first datasource type (e.g., a relational database) whereas a resolver function for a second schema object field (e.g., employee city) associated with a the same schema object (e.g., employee) may fetch data from a different backend datasource (e.g., a REST service).

At block 212, the system provides/publishes the GraphQL API schema 122 via a user interface of the computing device. In certain examples, such as in the embodiment depicted in FIG. 1, the schema generation subsystem 106 publishes the GraphQL API schema 122 and a set of resolver functions 124 defined for the object types in the schema via the schema generator/schema editor UI 112 of the GraphQL schema design UI 112. For example, to publish the generated GraphQL API schema 122, an API developer may select the "save" button 612 (e.g., as shown in GUI 602) to execute the publish operation. The schema generation subsystem 106 provides the published GraphQL API schema 122 and the set of resolver functions 124 to a GraphQL server (e.g., 120). The GraphQL server 120 uses the GraphQL API schema 122 and the resolver functions 124 to parse and validate an incoming GraphQL query request from an end user (e.g., 128), identify the operation (e.g., a query or a mutation) to execute and execute the operation against one or more backend data sources (e.g., 108A-108N) to return the results of the operation to the end user.

In certain embodiments, the GraphQL API schema 122 and the set of resolver functions 124 may be edited/modified by a user (e.g., an API developer 118) of the system 102 prior to the publishing of the schema. For instance, the API developer 118 may modify a GraphQL schema generated by the schema generation subsystem 106 by adding and/or removing object fields for object types defined in the schema, adding or removing object types, or by editing the resolver functions associated with an object field defined in the GraphQL schema. In certain implementations, a user may directly edit the GraphQL API schema via the GUI 602 or 702 shown in FIG. 6 and FIG. 7 respectively by adding or removing object types and/or object fields defined in the schema. In other implementations, the GraphQL API schema may be edited via the GUI 502 shown in FIG. 5 by editing one or more previously selected tables, columns and/or operations defined in the schema. For instance, the user, may via the UI add a column name to the schema, or remove a table that was previously selected via the GUI. The API developer may then select the "Generate Schema" button 308 to execute the modified selections to generate the modified/edited GraphQL schema.

Figure 8:
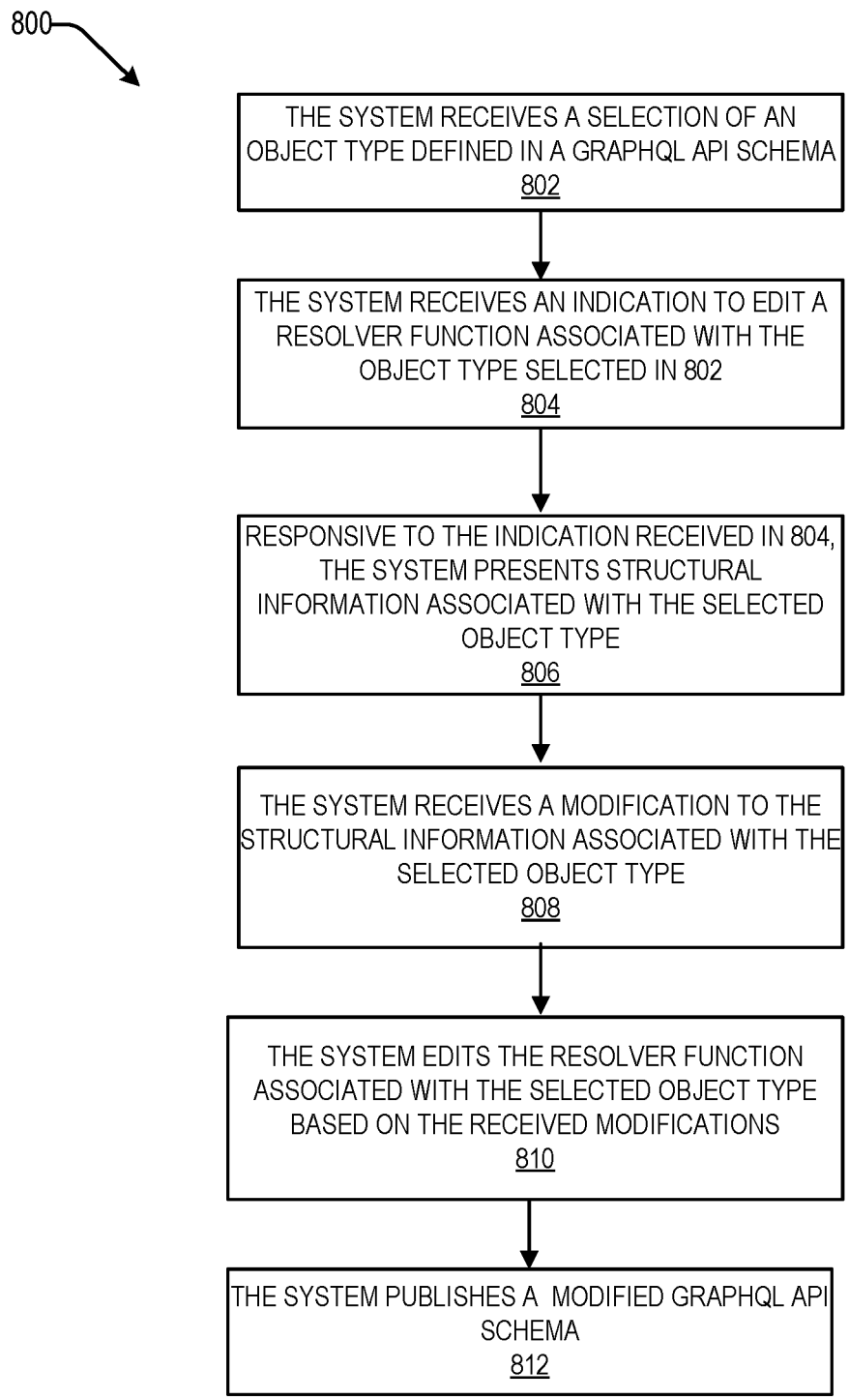
FIG. 8 depicts an example of a process for editing a resolver function for an object field defined in a GraphQL API schema, according to certain embodiments.

FIG. 8 depicts an example of a process 800 for editing a resolver function for an object field defined in a GraphQL API schema, according to certain embodiments. The processing depicted in FIG. 8 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 800 presented in FIG. 8 and described below is intended to be illustrative and non-limiting. Although FIG. 8 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 8 may be performed by the schema generation subsystem 106 of the GraphQL API schema design system 102.

At 802, processing is initiated when the schema generation subsystem 106 receives a selection of an object type defined in a GraphQL API schema (e.g., 604) from a user (e.g., an API developer 118 shown in FIG. 1) of the system 102. For example, in the embodiment depicted in FIG. 1, the API developer 118 may select an object type via the schema generator/schema editor UI 114 of the computing device 110. An example of a UI for selecting object type defined in a GraphQL API schema is shown in FIG. 9.

FIG. 9 depicts an example of a graphical user interface (GUI) 902 for selecting an object type defined in a GraphQL schema, according to certain embodiments. In certain examples, the GUI 902 may be a UI component of the schema generator/schema editor UI 114 that is provided to an API developer (e.g., 118) as part of the schema generation workflow. As shown in FIG. 9, in one example, an API developer may select a particular object type (e.g., employee 610) via the UI. In other examples, the API developer may select any other object field (e.g., country or courses) defined in the schema.

At block 804, the schema generation subsystem 106 receives an indication to edit a resolver function associated with the object type selected in block 802. For instance, using the example of the GUI 902 shown in FIG. 9, upon selecting an object type (employee 610), the API developer may select the "edit resolver" button 906 to edit a resolver function associated with the object type.

At block 806, responsive to the indication received in block 804, the schema generation subsystem 106 presents structural information associated with the selected object type. For an object type that represents a database table, the structural information may include, for instance, the name of the backend database that stores the table, columns associated with the table and the set of operations supported by the table and the columns of the table. For example, in the embodiment depicted in FIG. 1, the structural information for a selected object type may be displayed via the schema generator/schema editor UI 114 of the computing device 110. An example of a UI for displaying structural information for an object type selected in a GraphQL API schema is shown in FIG. 10.

Figure 10:
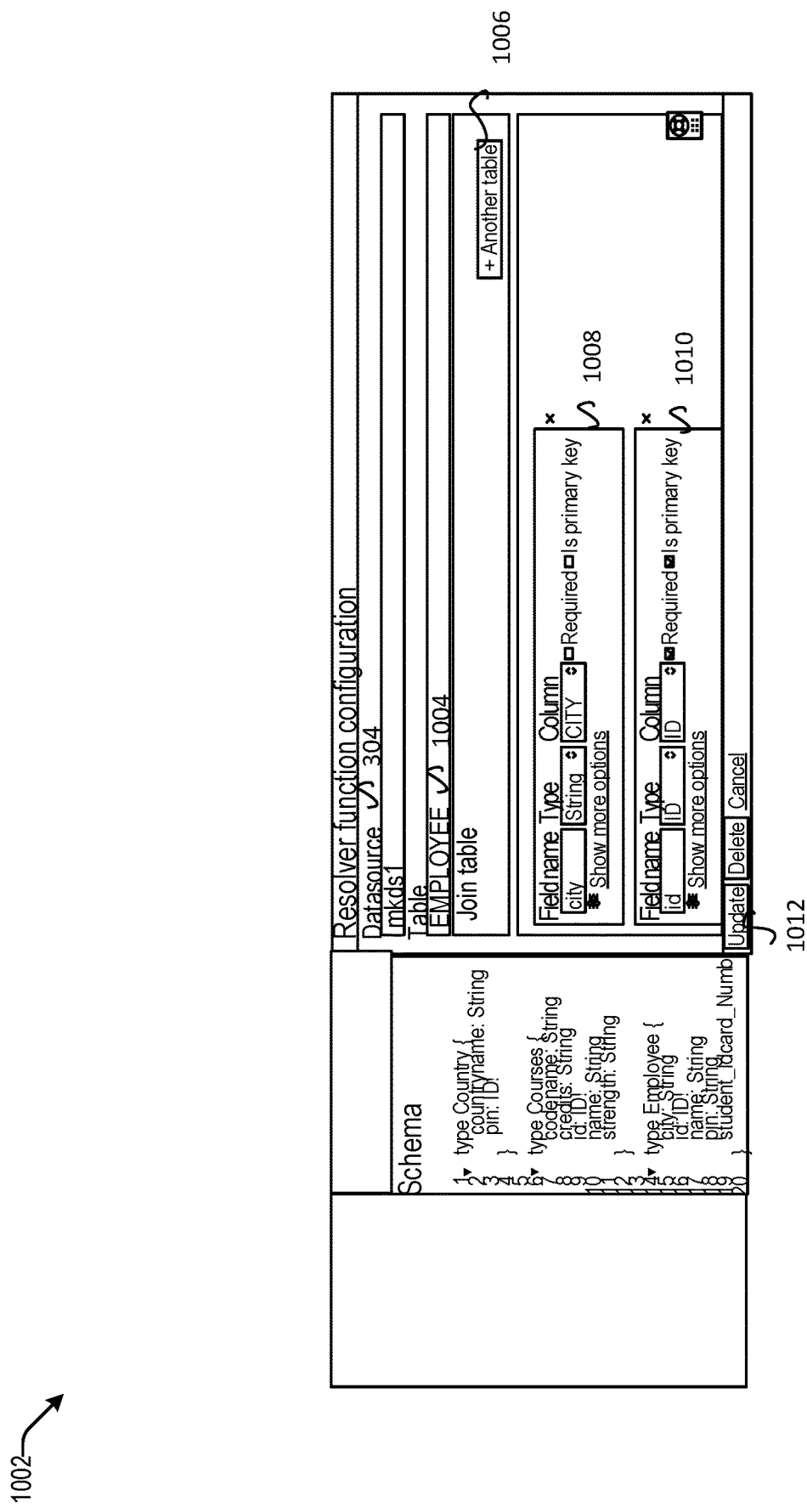
FIG. 10 depicts an example of a graphical user interface (GUI) that presents structural information for an object type selected in a GraphQL schema, according to certain embodiments.

FIG. 10 depicts an example of a graphical user interface (GUI) 1002 that presents structural information for an object type selected in a GraphQL schema, according to certain embodiments. In certain examples, the GUI 1002 may be a UI component of the schema generator/schema editor UI 114 that is provided to an API developer (e.g., 118) as part of the schema generation workflow. In the example shown in FIG. 10, the GUI 1002 presents structural information associated with a selected object type (employee 610). The structural information includes the database name (mkds1) of the datasource 304 associated with the object type, the database table (employee 1004) that corresponds to the selected object type and one or more columns of the table that correspond to the object fields (e.g., city, id) of the selected object type.

At block 808, the schema generation subsystem 106 receives modifications to the structural information associated with the selected object type. For instance, using the example of the GUI 1002 shown in FIG. 10, an API developer may modify the structural information associated with a selected object type by adding another table 1006 to be joined with the employee table, update the data type (i.e., string) of a column (e.g., city) of the employee table to point to a different data type (e.g., numeric) and so on.

At block 810, the schema generation subsystem 106 edits the resolver function (i.e., by editing the resolver metadata of the resolver function) associated with the selected object type based on the modifications received in block 818. For instance, based on a modification received via the GUI 1002 shown in FIG. 10, the schema generation subsystem 106 may modify the resolver function for an object field (id) to return a different data type (numeric) instead of a "string" data type. While the examples shown in GUI 902 and GUI 1002 illustrate a selection of a generic object type in a GraphQL schema, in other examples, the API developer may select to edit resolver functions associated with one or more query object types defined in the schema via the GUIs. For instance, a resolver function for a field (getCountry (pin: ID!): Country) 708 (shown in FIG. 7) for a query type object defined in the GraphQL API schema can be edited to retrieve a location (object field) for a country object instead of a pin code and so on.

At block 812, the schema generation subsystem 106 publishes the modified GraphQL API schema along with the modified resolver functions via the schema generator/schema editor UI 114. As previously described, the schema generation subsystem 106 provides the published GraphQL API schema 122 and the set of resolver functions 124 to a GraphQL server (e.g., 120). The GraphQL server receives a query from the end user and executes the GraphQL query against the GraphQL API schema and the GraphQL Resolvers to retrieve results for the end user.

Figure 11:
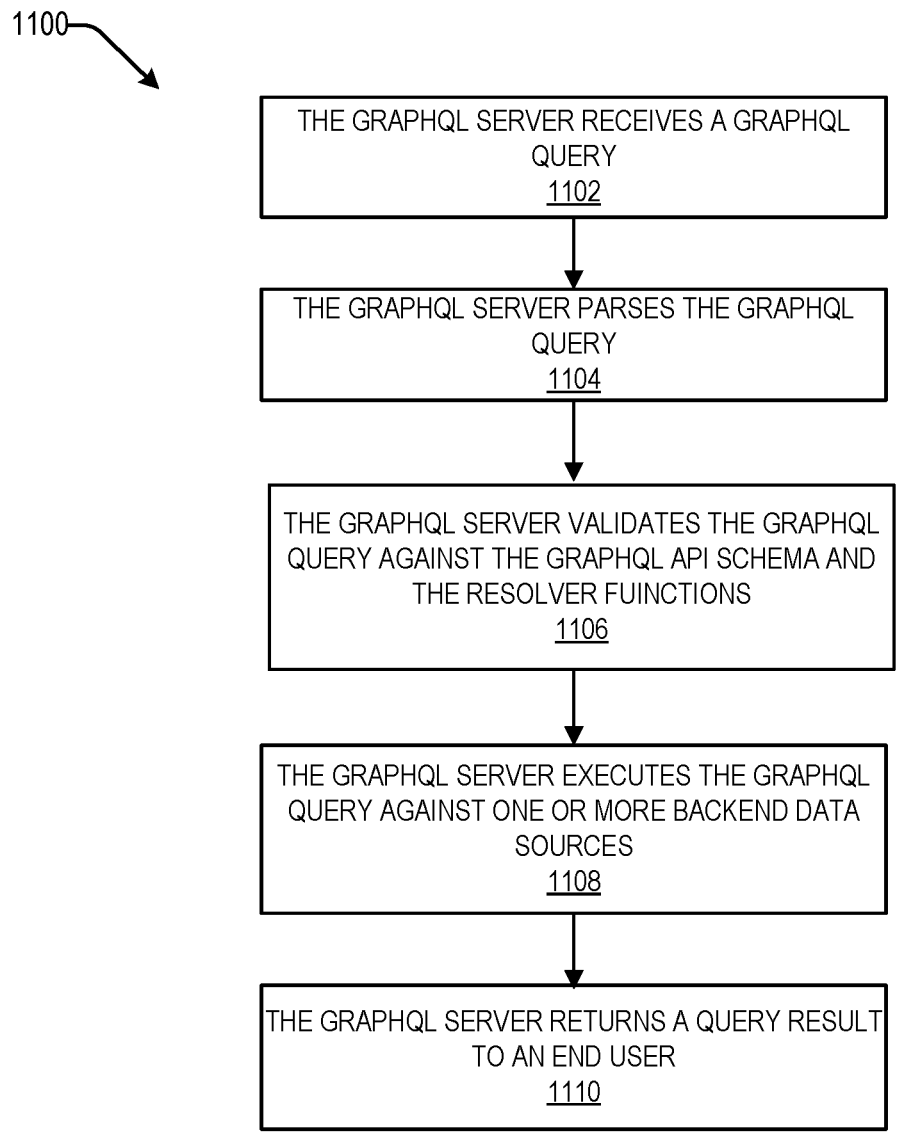
FIG. 11 depicts an example of a process performed by a GraphQL server for executing a GraphQL query, according to certain embodiments.

FIG. 11 depicts an example of a process 1100 performed by a GraphQL server for executing a GraphQL query, according to certain embodiments. The processing depicted in FIG. 11 may be implemented in software (e.g., code, instructions, program) executed by one or more processing units (e.g., processors, cores) of the respective systems, hardware, or combinations thereof. The software may be stored on a non-transitory storage medium (e.g., on a memory device). The process 1100 presented in FIG. 11 and described below is intended to be illustrative and non-limiting. Although FIG. 11 depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 1, the processing depicted in FIG. 11 may be performed by the GraphQL server 120.

At 1102, processing is initiated when the GraphQL server 120 receives a GraphQL query 130 from an end user (e.g., 126). For instance, the end user may submit a GraphQL query 130 via an application UI 128 of a client device 124. The client device can be of various types, including but not limited to, a mobile phone, a tablet, a desktop computer, and the like. At block 1104, the GraphQL server parses the incoming GraphQL query 130 to determine the operations (e.g., a query or a mutation) to be executed by the query. At block 1106, the GraphQL server validates the query against the GraphQL API schema 122 and the resolver functions 124 to ensure that the query refers to the types and fields defined in the schema. At block 1108, the GraphQL server executes the operations defined in the query against one or more backend data sources (e.g., 108A-108N). At block 1108, the GraphQL server returns a query result 132 to the end user.

FIGS. 3-11 described the processing performed by the subsystems (104, 106) of the graphQL API schema design system 102 shown in FIG. 1 to generate a GraphQL API schema by introspecting a database datasource. Additionally, the examples described in FIGS. 3-11 described various datasource introspection UI components of the schema introspection UI 114 for performing database introspection. The UI components enabled a user (e.g., an API developer) to select relevant tables and their columns as GraphQL schema objects and schema fields along with the operations that can be executed on those objects to generate a GraphQL API schema. The examples described in FIGS. 3-11 also described schema generation UI components that provided users with the ability to edit object types and/or object fields of the schema and edit resolver functions of the object fields as part of the schema generation workflow.

In certain embodiments, the subsystems (104, 106) of the GraphQL API schema design system 102 shown in FIG. 1 may be configured to perform introspection of a REST datasource (also referred to herein as a REST API datasource or a REST service) and based on the introspection, generate a GraphQL API schema and resolver functions for retrieving data from the REST datasource. FIGS. 12-16 depicted below describe various datasource introspection UI components provided by the schema introspection UI 114 and various schema generation UI components provided by the schema generation subsystem 106 to enable a user (e.g., API developer) to introspect an open API specification of a REST service and choose APIs and resources with the needed fields that need to be exposed as objects and operations in a GraphQL schema.

Figure 12:
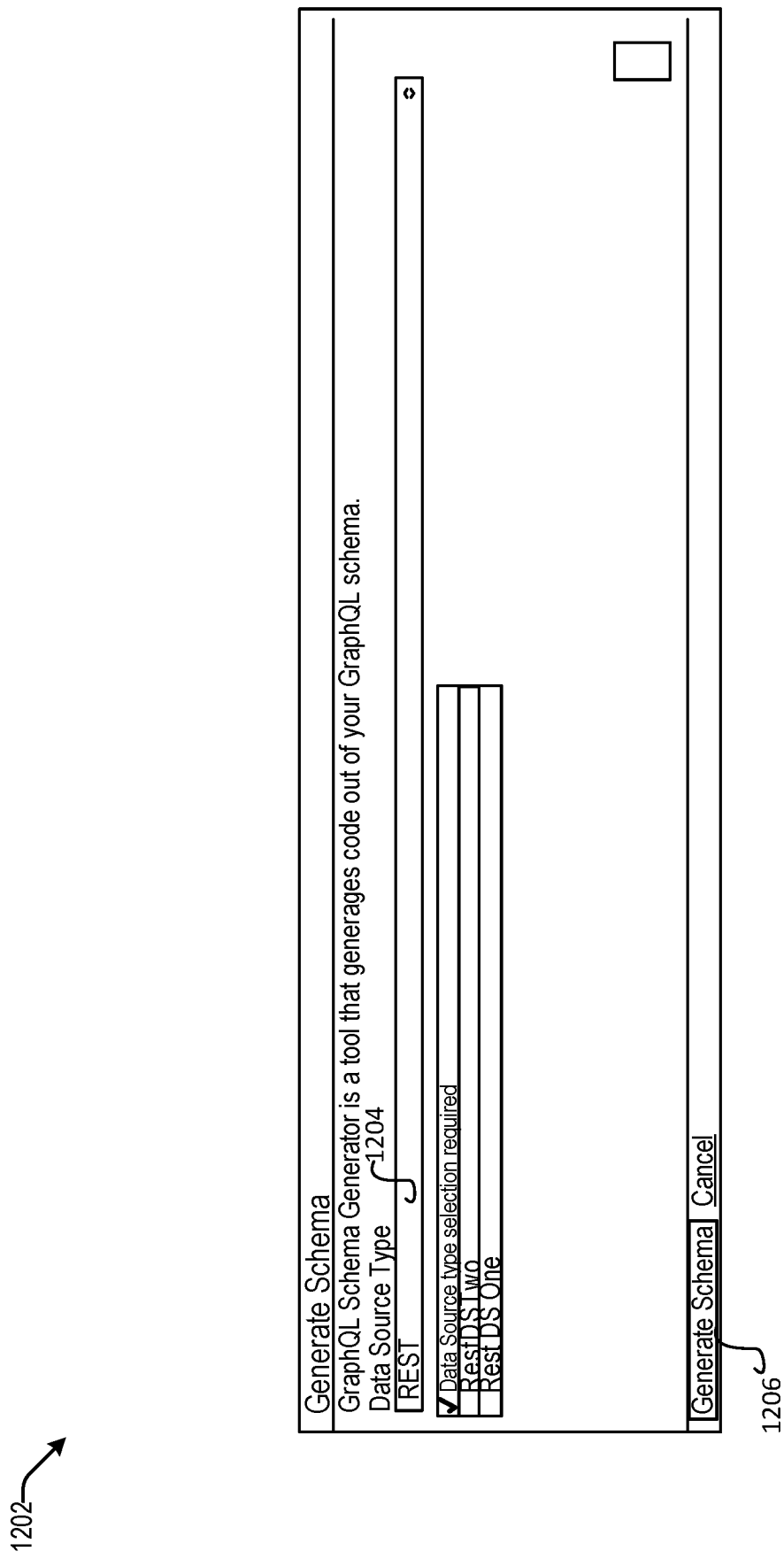
FIG. 12 depicts an example of a graphical user interface (GUI) for selecting a particular datasource, according to certain embodiments.

As previously described in FIG. 2, as part of the datasource introspection workflow, the schema introspection subsystem 104 provides an API developer (e.g., 118) with a schema introspection UI 114 that is displayed on a computing device (e.g., 110) to select a particular datasource type. FIG. 12 depicts an example of a graphical user interface (GUI) 1202 for selecting a particular datasource, according to certain embodiments. The GUI 1202 may be a UI component of the schema introspection UI 114 that is provided to an API developer (e.g., 118) as part of the datasource introspection workflow. In the example depicted in FIG. 12, an API developer selects a REST datasource 1204 to generate a GraphQL API schema. After selecting the REST datasource (e.g., RESTDS Two or RESTDS One) the API developer selects the "generate schema" button 1206 to execute the select operation.

Figure 13:
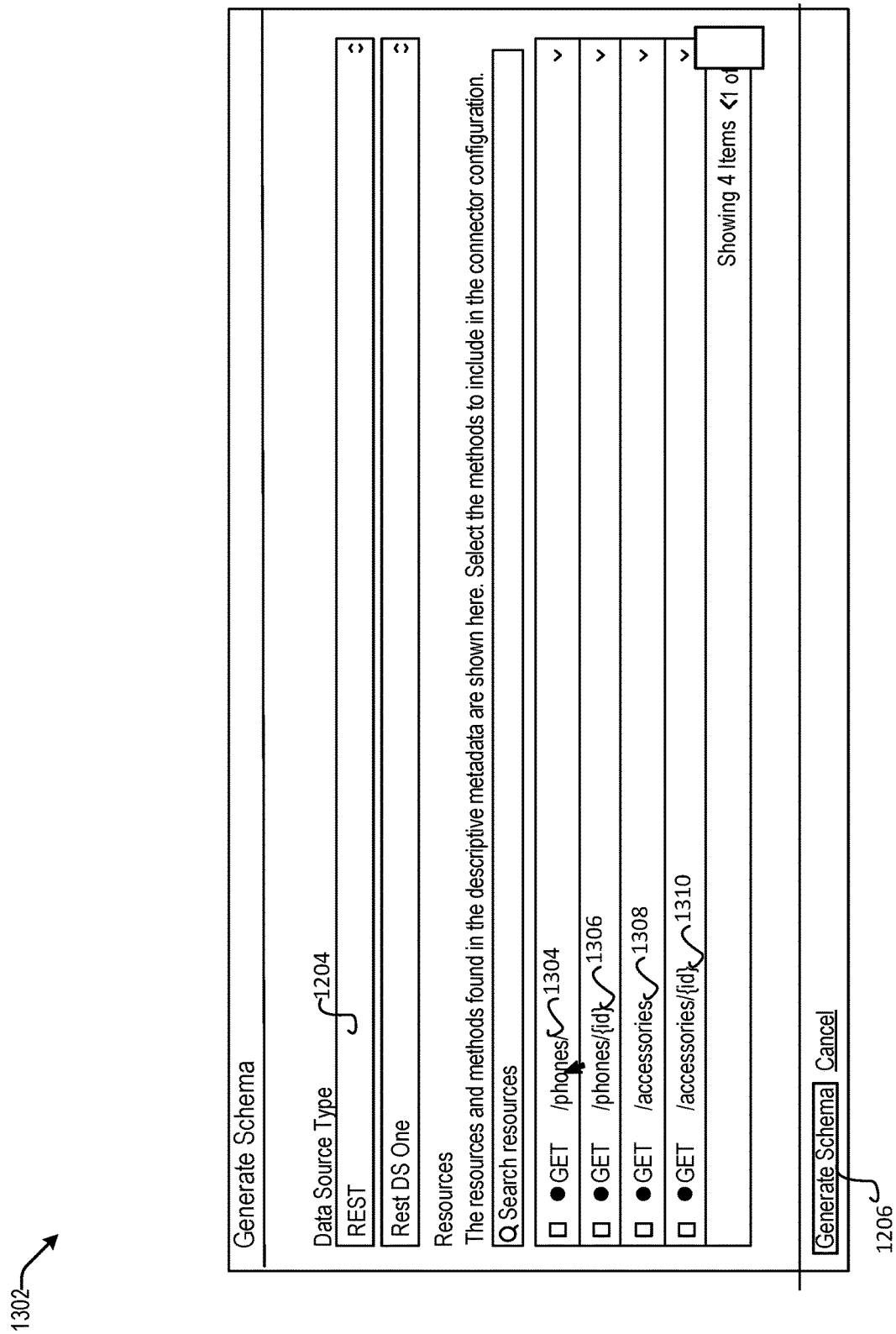
FIG. 13 depicts an example of a graphical user interface (GUI) that presents REST API specification information for a REST API datasource, according to certain embodiments.

Upon selecting the "generate schema" button 1206, the schema introspection subsystem 104 retrieves the REST API specification from the REST datasource and presents the REST API specification via the schema introspection UI 114. FIG. 13 depicts an example of a graphical user interface (GUI) 1302 that presents REST API specification information for a REST datasource, according to certain embodiments. As depicted in the GUI 1302, the REST API specification includes a list of REST APIs (1304, 1306, 1308, 1310) used to retrieve data from the REST datasource. The API developer may select a particular REST API from this list to obtain additional information related to the API. For instance, in the UI 1302, upon selecting the GET/phones/ API 1304, the API developer is presented with additional information related to the API such as its parameters, request payload information and response parameters as shown in FIG. 14.

FIG. 14 depicts an example of a graphical user interface (GUI) 1402 that presents REST API specification information related to a REST API, according to certain embodiments. As depicted in FIG. 14, information related to a REST API may include a list of query parameters associated with the API and response body information associated with the REST API. A developer may select one or more query parameters via the UI 1402. The query parameters may be represented (exposed) via the UI 1402 as object fields 1408 of the GraphQL schema. For instance, in the UI 1402 depicted in FIG. 14, the API developer selects five object fields (id, os, make model, and apps) to expose in the GraphQL API schema. After selecting the object fields, the API developer selects the "generate selection" button 1410 to execute the select operation. The API developer then selects the "generate schema" button to generate a GraphQL API schema based on the REST datasource.

Figure 15:
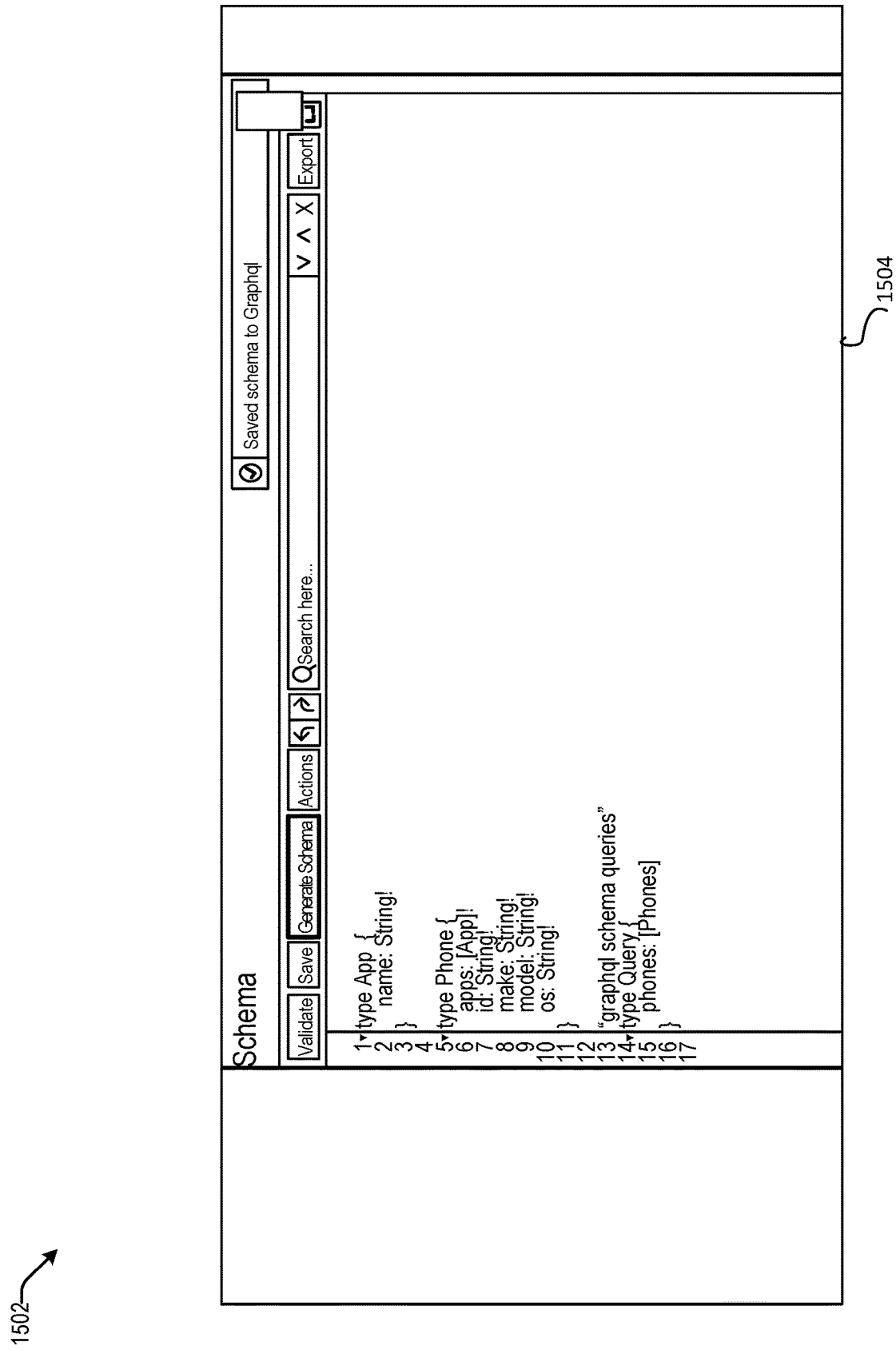
FIG. 15 depicts an example of a graphical user interface (GUI) that presents a GraphQL API schema that is created by introspecting a REST datasource, according to certain embodiments.

FIG. 15 depicts an example of a graphical user interface (GUI) 1502 that presents a GraphQL API schema that is created by introspecting a REST datasource, according to certain embodiments. In certain examples, such as in the embodiment depicted in FIG. 1, the GraphQL API schema may be displayed via a schema generator/schema editor 116 of the computing device 110. In certain examples, the GUI 1502 may be a UI component of the schema generator/ schema editor UI 116 and presented to a user (e.g., an API developer) of the system 102 as part of the schema generation workflow performed by the schema generation subsystem 106. As depicted in FIG. 15, the GraphQL schema 1504 comprises the REST APIs and resources associated with the needed fields that are exposed as objects and operations in the GraphQL schema.

FIG. 16 depicts an example of a graphical user interface (GUI) 1602 that presents additional details of the GraphQL API schema 1504 shown in FIG. 15 that is created by introspecting a REST datasource, according to certain embodiments. In certain examples, the GUI 1602 may be a UI component of the schema generator/schema editor UI 116 and presented to a user (e.g., an API developer) of the system 102 as part of the schema generation workflow performed by the schema generation subsystem 106. As depicted in FIG. 16, the GraphQL schema 1504 additionally include a student object type and a query type that is created by introspecting a REST datasource. The GraphQL API schema 1504 additionally displays an "edit resolver" button 1604 to enable the user to edit a resolver function associated with an object type defined in the schema. For instance, by selecting the "edit resolver" button 1604, the user can edit the resolver function associated with the "phone" object defined in the schema. As a result of selecting the edit resolver button, resolver configuration details associated with the phone object are displayed to the user via a GUI as shown in FIG. 17.

Figure 17:
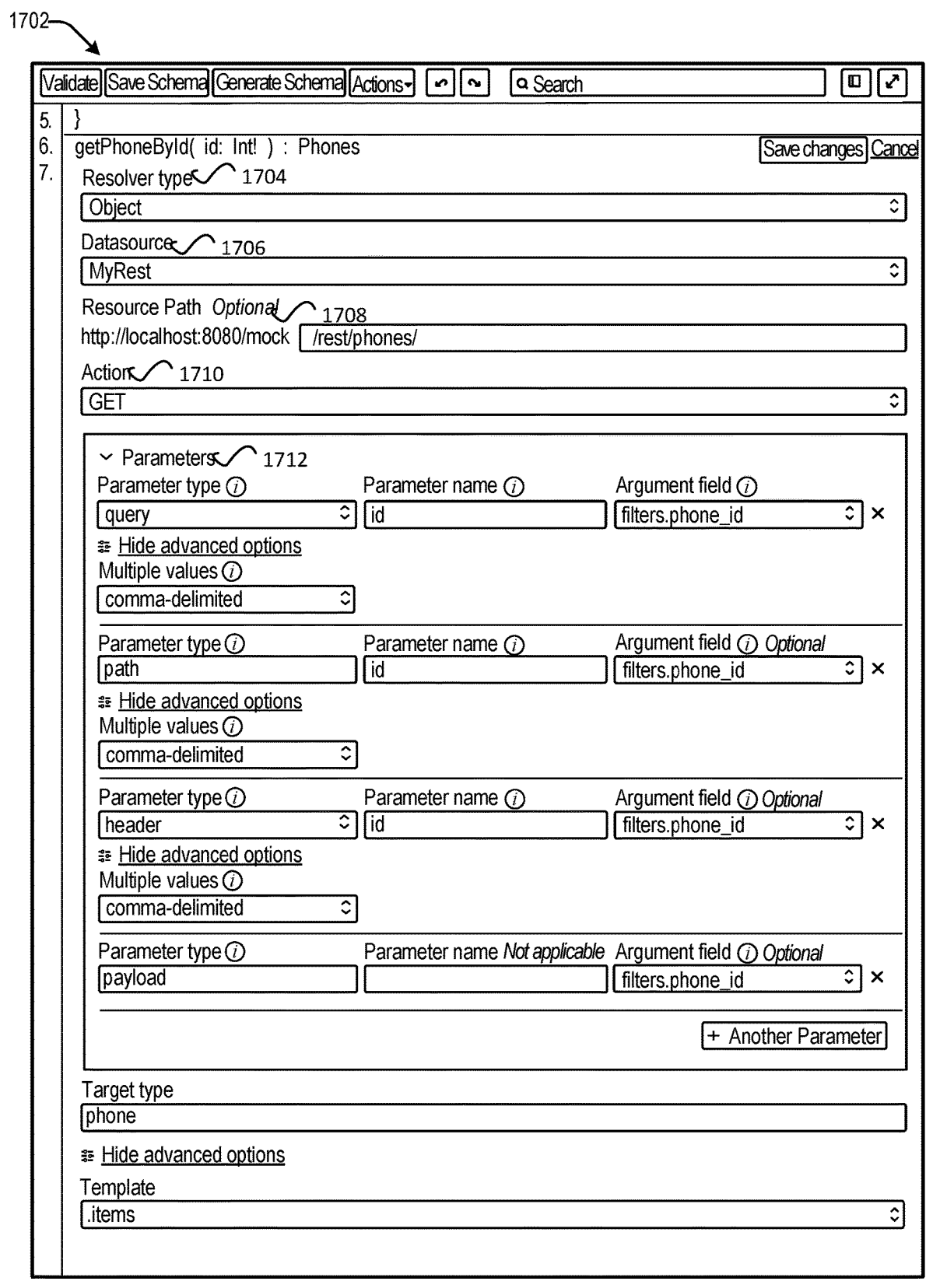

FIG. 17 depicts an example of a graphical user interface 1702 for editing a resolver function associated with a REST object, according to certain embodiments. In the depicted example, the configuration details of a resolver function, getPhoneById (id: Int!): Phones for a "phone" object type associated with a REST API are shown via the GUI 1602. The configuration details for the resolver function that may be edited include, for instance, a resolver type 1704, the backend REST datasource 1706, a resource path 1708 to the resource (object) to be acted upon, the verb that defines the action 1710 (e.g., GET) to take regarding the resource, and one or more parameters 1712 to be included in the header of the REST API request. Based on the modifications, the metadata associated with the modified resolver function is made available to the API developer as part of the GraphQL API development process.

FIG. 18 depicts another example of a graphical user interface 1702 for editing a resolver function associated with a REST object, according to certain embodiments. In the example shown in FIG. 18, a user (e.g., an API developer) can additionally edit configuration details associated with the resolver function to select a secondary datasource 1804 as a backend REST datasource and to modify query parameters 1806 associated with the REST API. For instance, the user can change the datatype of the parameter associated with a query parameter, edit the argument field of the query parameter and change the fields of the query parameter via the UI 1802. Based on the modifications, the metadata associated with the modified resolver function is made available to the API developer as part of the GraphQL API development process.

The disclosed system thus provides users with the ability to introspect different types of backend datasources, including, but not limited to, relational databases, REST APIs, graph databases, micro-services, web services and so on. The database introspection not only allows selection of individual database tables as schema objects but also the selection of individual columns of a table as fields of schema objects represented in a GraphQL API schema as well as operations allowed on the schema objects. The system additionally includes capabilities to perform REST API introspection, where users can inspect (i.e., introspect) an open API specification of a REST service and choose APIs and resources with the needed fields that need to be exposed as objects and operations in the GraphQL schema. Thus, a user of the system 102 is able to create objects from a combination of backend datasources such as relational databases, REST services and so on and make the objects available for querying in a GraphQL schema.

Example Cloud Service Infrastructure Architecture

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 19:
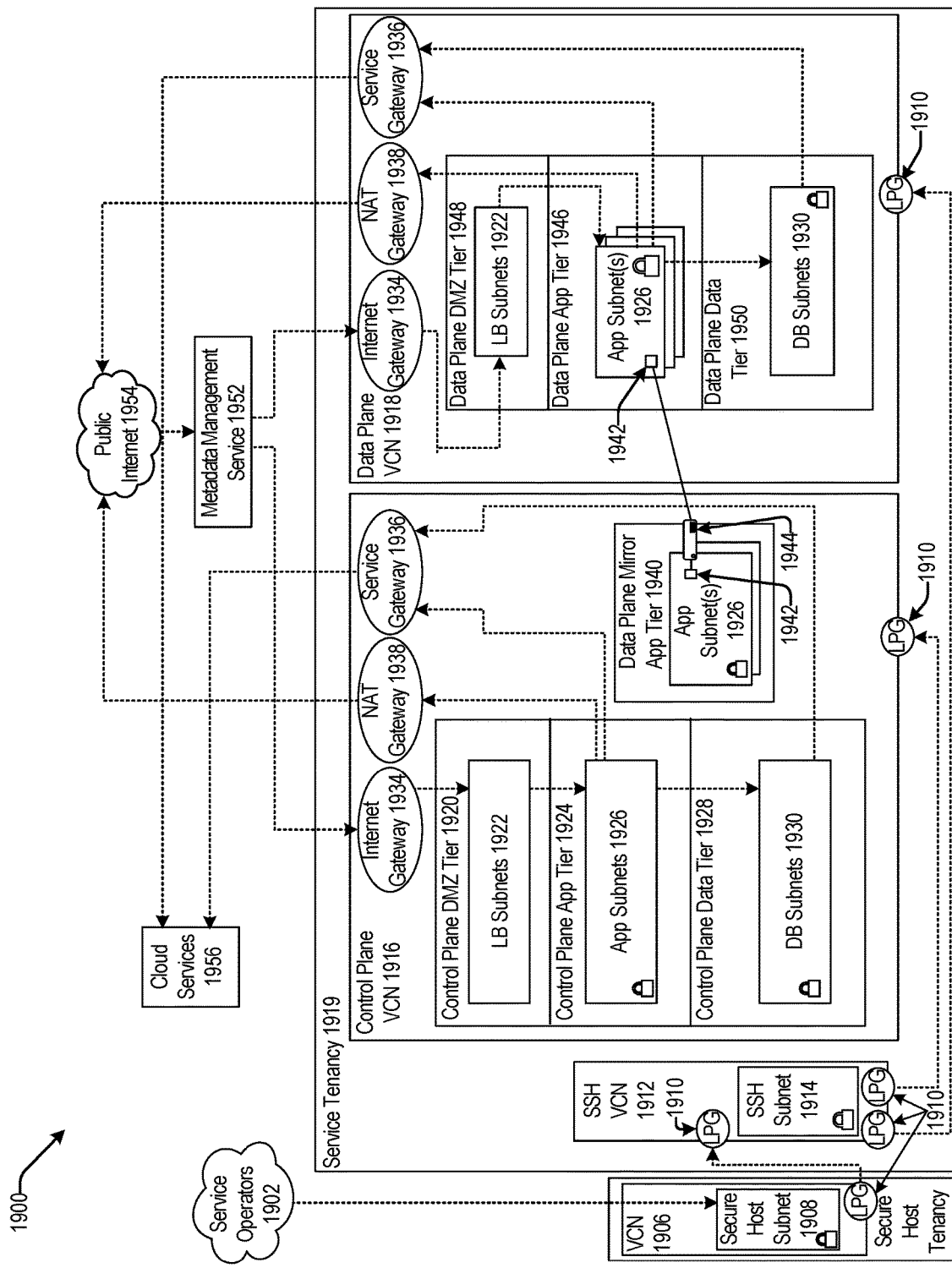
FIG. 19 is a block diagram illustrating one pattern for implementing a cloud infrastructure as a service system, according to at least one embodiment.

FIG. 19 is a block diagram 1900 illustrating an example pattern of an IaaS architecture, according to at least one embodiment. Service operators 1902 can be communicatively coupled to a secure host tenancy 1904 that can include a virtual cloud network (VCN) 1906 and a secure host subnet 1908. In some examples, the service operators 1902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1906 and/or the Internet.

The VCN 1906 can include a local peering gateway (LPG) 1910 that can be communicatively coupled to a secure shell (SSH) VCN 1912 via an LPG 1910 contained in the SSH VCN 1912. The SSH VCN 1912 can include an SSH subnet 1914, and the SSH VCN 1912 can be communicatively coupled to a control plane VCN 1916 via the LPG 1910 contained in the control plane VCN 1916. Also, the SSH VCN 1912 can be communicatively coupled to a data plane VCN 1918 via an LPG 1910. The control plane VCN 1916 and the data plane VCN 1918 can be contained in a service tenancy 1919 that can be owned and/or operated by the IaaS provider.

The control plane VCN 1916 can include a control plane demilitarized zone (DMZ) tier 1920 that acts as a perimeter network (e.g., portions of a corporate network between the corporate intranet and external networks). The DMZ-based servers may have restricted responsibilities and help keep breaches contained. Additionally, the DMZ tier 1920 can include one or more load balancer (LB) subnet(s) 1922, a control plane app tier 1924 that can include app subnet(s) 1926, a control plane data tier 1928 that can include database (DB) subnet(s) 1930 (e.g., frontend DB subnet(s) and/or backend DB subnet(s)). The LB subnet(s) 1922 contained in the control plane DMZ tier 1920 can be communicatively coupled to the app subnet(s) 1926 contained in the control plane app tier 1924 and an Internet gateway 1934 that can be contained in the control plane VCN 1916, and the app subnet(s) 1926 can be communicatively coupled to the DB subnet(s) 1930 contained in the control plane data tier 1928 and a service gateway 1936 and a network address translation (NAT) gateway 1938. The control plane VCN 1916 can include the service gateway 1936 and the NAT gateway 1938.

The control plane VCN 1916 can include a data plane mirror app tier 1940 that can include app subnet(s) 1926. The app subnet(s) 1926 contained in the data plane mirror app tier 1940 can include a virtual network interface controller (VNIC) 1942 that can execute a compute instance 1944. The compute instance 1944 can communicatively couple the app subnet(s) 1926 of the data plane mirror app tier 1940 to app subnet(s) 1926 that can be contained in a data plane app tier 1946.

The data plane VCN 1918 can include the data plane app tier 1946, a data plane DMZ tier 1948, and a data plane data tier 1950. The data plane DMZ tier 1948 can include LB subnet(s) 1922 that can be communicatively coupled to the app subnet(s) 1926 of the data plane app tier 1946 and the Internet gateway 1934 of the data plane VCN 1918. The app subnet(s) 1926 can be communicatively coupled to the service gateway 1936 of the data plane VCN 1918 and the NAT gateway 1938 of the data plane VCN 1918. The data plane data tier 1950 can also include the DB subnet(s) 1930 that can be communicatively coupled to the app subnet(s) 1926 of the data plane app tier 1946.

The Internet gateway 1934 of the control plane VCN 1916 and of the data plane VCN 1918 can be communicatively coupled to a metadata management service 1952 that can be communicatively coupled to public Internet 1954. Public Internet 1954 can be communicatively coupled to the NAT gateway 1938 of the control plane VCN 1916 and of the data plane VCN 1918. The service gateway 1936 of the control plane VCN 1916 and of the data plane VCN 1918 can be communicatively couple to cloud services 1956.

In some examples, the service gateway 1936 of the control plane VCN 1916 or of the data plane VCN 1918 can make application programming interface (API) calls to cloud services 1956 without going through public Internet 1954. The API calls to cloud services 1956 from the service gateway 1936 can be one-way: the service gateway 1936 can make API calls to cloud services 1956, and cloud services 1956 can send requested data to the service gateway 1936. But, cloud services 1956 may not initiate API calls to the service gateway 1936.

In some examples, the secure host tenancy 1904 can be directly connected to the service tenancy 1919, which may be otherwise isolated. The secure host subnet 1908 can communicate with the SSH subnet 1914 through an LPG 1910 that may enable two-way communication over an otherwise isolated system. Connecting the secure host subnet 1908 to the SSH subnet 1914 may give the secure host subnet 1908 access to other entities within the service tenancy 1919.

The control plane VCN 1916 may allow users of the service tenancy 1919 to set up or otherwise provision desired resources. Desired resources provisioned in the control plane VCN 1916 may be deployed or otherwise used in the data plane VCN 1918. In some examples, the control plane VCN 1916 can be isolated from the data plane VCN 1918, and the data plane mirror app tier 1940 of the control plane VCN 1916 can communicate with the data plane app tier 1946 of the data plane VCN 1918 via VNICs 1942 that can be contained in the data plane mirror app tier 1940 and the data plane app tier 1946.

In some examples, users of the system, or customers, can make requests, for example create, read, update, or delete (CRUD) operations, through public Internet 1954 that can communicate the requests to the metadata management service 1952. The metadata management service 1952 can communicate the request to the control plane VCN 1916 through the Internet gateway 1934. The request can be received by the LB subnet(s) 1922 contained in the control plane DMZ tier 1920. The LB subnet(s) 1922 may determine that the request is valid, and in response to this determination, the LB subnet(s) 1922 can transmit the request to app subnet(s) 1926 contained in the control plane app tier 1924. If the request is validated and requires a call to public Internet 1954, the call to public Internet 1954 may be transmitted to the NAT gateway 1938 that can make the call to public Internet 1954. Metadata that may be desired to be stored by the request can be stored in the DB subnet(s) 1930.

In some examples, the data plane mirror app tier 1940 can facilitate direct communication between the control plane VCN 1916 and the data plane VCN 1918. For example, changes, updates, or other suitable modifications to configuration may be desired to be applied to the resources contained in the data plane VCN 1918. Via a VNIC 1942, the control plane VCN 1916 can directly communicate with, and can thereby execute the changes, updates, or other suitable modifications to configuration to, resources contained in the data plane VCN 1918.

In some embodiments, the control plane VCN 1916 and the data plane VCN 1918 can be contained in the service tenancy 1919. In this case, the user, or the customer, of the system may not own or operate either the control plane VCN 1916 or the data plane VCN 1918. Instead, the IaaS provider may own or operate the control plane VCN 1916 and the data plane VCN 1918, both of which may be contained in the service tenancy 1919. This embodiment can enable isolation of networks that may prevent users or customers from interacting with other users', or other customers', resources. Also, this embodiment may allow users or customers of the system to store databases privately without needing to rely on public Internet 1954, which may not have a desired level of threat prevention, for storage.

In other embodiments, the LB subnet(s) 1922 contained in the control plane VCN 1916 can be configured to receive a signal from the service gateway 1936. In this embodiment, the control plane VCN 1916 and the data plane VCN 1918 may be configured to be called by a customer of the IaaS provider without calling public Internet 1954. Customers of the IaaS provider may desire this embodiment since database(s) that the customers use may be controlled by the IaaS provider and may be stored on the service tenancy 1919, which may be isolated from public Internet 1954.

Figure 20:
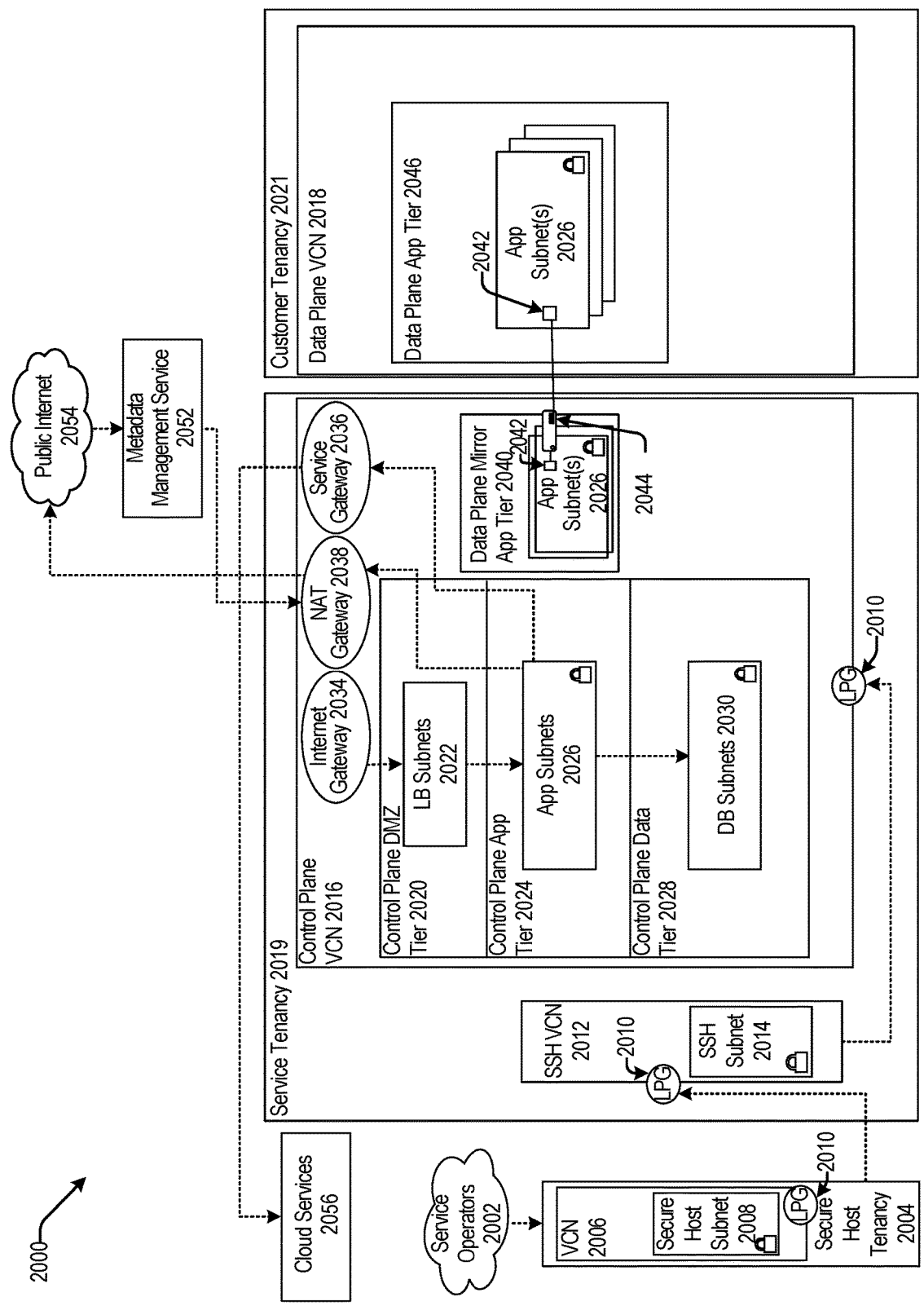
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g., service operators 1902 of FIG. 19) can be communicatively coupled to a secure host tenancy 2004 (e.g., the secure host tenancy 1904 of FIG. 19) that can include a virtual cloud network (VCN) 2006 (e.g., the VCN 1906 of FIG. 19) and a secure host subnet 2008 (e.g., the secure host subnet 1908 of FIG. 19). The VCN 2006 can include a local peering gateway (LPG) 2010 (e.g., the LPG 1910 of FIG. 19) that can be communicatively coupled to a secure shell (SSH) VCN 2012 (e.g., the SSH VCN 1912 of FIG. 19) via an LPG 1910 contained in the SSH VCN 2012. The SSH VCN 2012 can include an SSH subnet 2014 (e.g., the SSH subnet 1914 of FIG. 19), and the SSH VCN 2012 can be communicatively coupled to a control plane VCN 2016 (e.g., the control plane VCN 1916 of FIG. 19) via an LPG 2010 contained in the control plane VCN 2016. The control plane VCN 2016 can be contained in a service tenancy 2019 (e.g., the service tenancy 1919 of FIG. 19), and the data plane VCN 2018 (e.g., the data plane VCN 1918 of FIG. 19) can be contained in a customer tenancy 2021 that may be owned or operated by users, or customers, of the system.

The control plane VCN 2016 can include a control plane DMZ tier 2020 (e.g., the control plane DMZ tier 1920 of FIG. 19) that can include LB subnet(s) 2022 (e.g., LB subnet(s) 1922 of FIG. 19), a control plane app tier 2024 (e.g., the control plane app tier 1924 of FIG. 19) that can include app subnet(s) 2026 (e.g., app subnet(s) 1926 of FIG. 19), a control plane data tier 2028 (e.g., the control plane data tier 1928 of FIG. 19) that can include database (DB) subnet(s) 2030 (e.g., similar to DB subnet(s) 1930 of FIG. 19). The LB subnet(s) 2022 contained in the control plane DMZ tier 2020 can be communicatively coupled to the app subnet(s) 2026 contained in the control plane app tier 2024 and an Internet gateway 2034 (e.g., the Internet gateway 1934 of FIG. 19) that can be contained in the control plane VCN 2016, and the app subnet(s) 2026 can be communicatively coupled to the DB subnet(s) 2030 contained in the control plane data tier 2028 and a service gateway 2036 (e.g., the service gateway 1936 of FIG. 19) and a network address translation (NAT) gateway 2038 (e.g., the NAT gateway 1938 of FIG. 19). The control plane VCN 2016 can include the service gateway 2036 and the NAT gateway 2038.

The control plane VCN 2016 can include a data plane mirror app tier 2040 (e.g., the data plane mirror app tier 1940 of FIG. 19) that can include app subnet(s) 2026. The app subnet(s) 2026 contained in the data plane mirror app tier 2040 can include a virtual network interface controller (VNIC) 2042 (e.g., the VNIC of 1942) that can execute a compute instance 2044 (e.g., similar to the compute instance 1944 of FIG. 19). The compute instance 2044 can facilitate communication between the app subnet(s) 2026 of the data plane mirror app tier 2040 and the app subnet(s) 2026 that can be contained in a data plane app tier 2046 (e.g., the data plane app tier 1946 of FIG. 19) via the VNIC 2042 contained in the data plane mirror app tier 2040 and the VNIC 2042 contained in the data plane app tier 2046.

The Internet gateway 2034 contained in the control plane VCN 2016 can be communicatively coupled to a metadata management service 2052 (e.g., the metadata management service 1952 of FIG. 19) that can be communicatively coupled to public Internet 2054 (e.g., public Internet 1954 of FIG. 19). Public Internet 2054 can be communicatively coupled to the NAT gateway 2038 contained in the control plane VCN 2016. The service gateway 2036 contained in the control plane VCN 2016 can be communicatively couple to cloud services 2056 (e.g., cloud services 1956 of FIG. 19).

In some examples, the data plane VCN 2018 can be contained in the customer tenancy 2021. In this case, the IaaS provider may provide the control plane VCN 2016 for each customer, and the IaaS provider may, for each customer, set up a unique compute instance 2044 that is contained in the service tenancy 2019. Each compute instance 2044 may allow communication between the control plane VCN 2016, contained in the service tenancy 2019, and the data plane VCN 2018 that is contained in the customer tenancy 2021. The compute instance 2044 may allow resources, that are provisioned in the control plane VCN 2016 that is contained in the service tenancy 2019, to be deployed or otherwise used in the data plane VCN 2018 that is contained in the customer tenancy 2021.

In other examples, the customer of the IaaS provider may have databases that live in the customer tenancy 2021. In this example, the control plane VCN 2016 can include the data plane mirror app tier 2040 that can include app subnet(s) 2026. The data plane mirror app tier 2040 can reside in the data plane VCN 2018, but the data plane mirror app tier 2040 may not live in the data plane VCN 2018. That is, the data plane mirror app tier 2040 may have access to the customer tenancy 2021, but the data plane mirror app tier 2040 may not exist in the data plane VCN 2018 or be owned or operated by the customer of the IaaS provider. The data plane mirror app tier 2040 may be configured to make calls to the data plane VCN 2018 but may not be configured to make calls to any entity contained in the control plane VCN 2016. The customer may desire to deploy or otherwise use resources in the data plane VCN 2018 that are provisioned in the control plane VCN 2016, and the data plane mirror app tier 2040 can facilitate the desired deployment, or other usage of resources, of the customer.

In some embodiments, the customer of the IaaS provider can apply filters to the data plane VCN 2018. In this embodiment, the customer can determine what the data plane VCN 2018 can access, and the customer may restrict access to public Internet 2054 from the data plane VCN 2018. The IaaS provider may not be able to apply filters or otherwise control access of the data plane VCN 2018 to any outside networks or databases. Applying filters and controls by the customer onto the data plane VCN 2018, contained in the customer tenancy 2021, can help isolate the data plane VCN 2018 from other customers and from public Internet 2054.

In some embodiments, cloud services 2056 can be called by the service gateway 2036 to access services that may not exist on public Internet 2054, on the control plane VCN 2016, or on the data plane VCN 2018. The connection between cloud services 2056 and the control plane VCN 2016 or the data plane VCN 2018 may not be live or continuous. Cloud services 2056 may exist on a different network owned or operated by the IaaS provider. Cloud services 2056 may be configured to receive calls from the service gateway 2036 and may be configured to not receive calls from public Internet 2054. Some cloud services 2056 may be isolated from other cloud services 2056, and the control plane VCN 2016 may be isolated from cloud services 2056 that may not be in the same region as the control plane VCN 2016. For example, the control plane VCN 2016 may be located in "Region 1," and cloud service "Deployment 19," may be located in Region 1 and in "Region 2." If a call to Deployment 19 is made by the service gateway 2036 contained in the control plane VCN 2016 located in Region 1, the call may be transmitted to Deployment 19 in Region 1. In this example, the control plane VCN 2016, or Deployment 19 in Region 1, may not be communicatively coupled to, or otherwise in communication with, Deployment 19 in Region 2.

Figure 21:
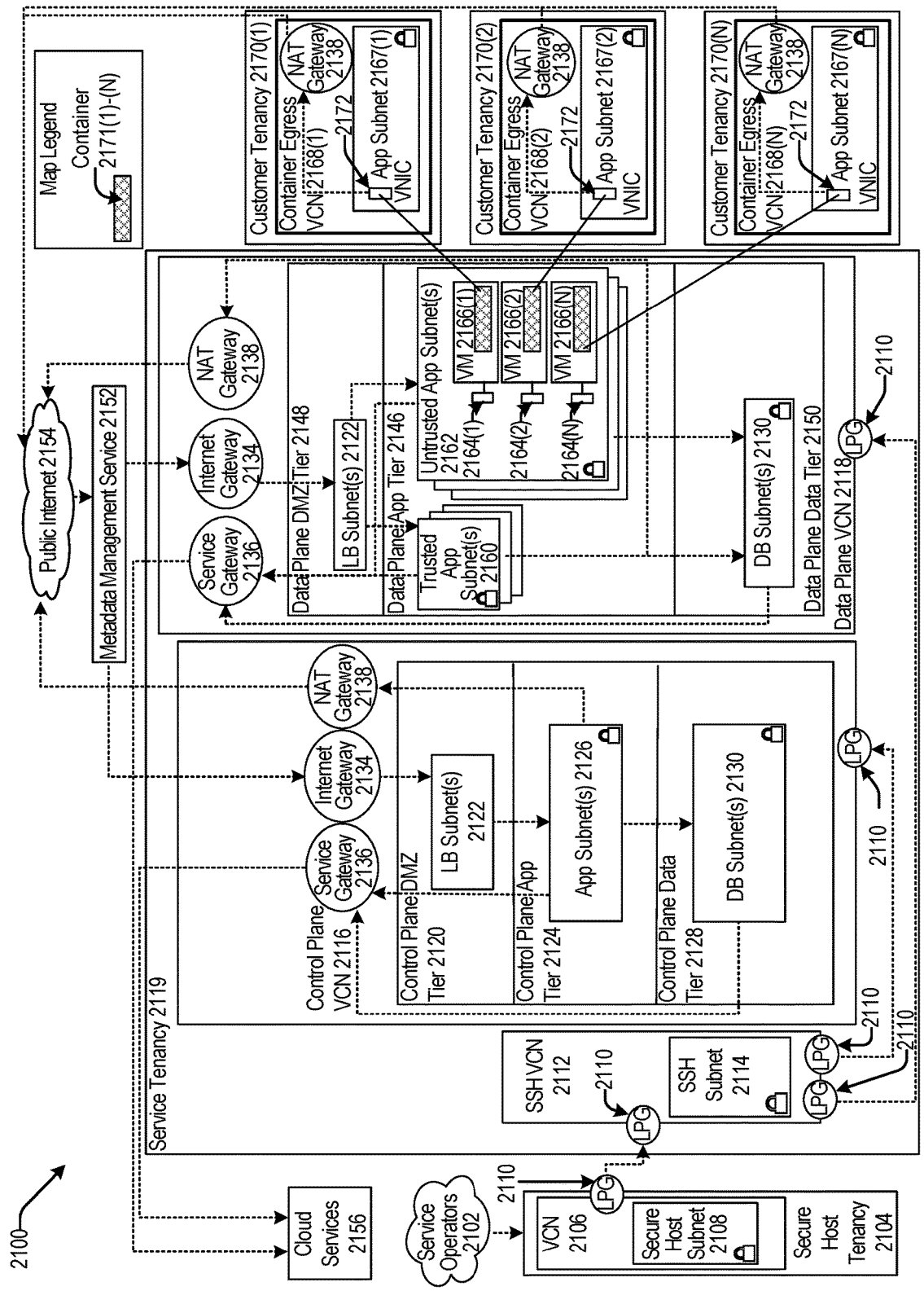
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g., service operators 1902 of FIG. 19) can be communicatively coupled to a secure host tenancy 2104 (e.g., the secure host tenancy 1904 of FIG. 19) that can include a virtual cloud network (VCN) 2106 (e.g., the VCN 1906 of FIG. 19) and a secure host subnet 2108 (e.g., the secure host subnet 1908 of FIG. 19). The VCN 2106 can include an LPG 2110 (e.g., the LPG 1910 of FIG. 19) that can be communicatively coupled to an SSH VCN 2112 (e.g., the SSH VCN 1912 of FIG. 19) via an LPG 2110 contained in the SSH VCN 2112. The SSH VCN 2112 can include an SSH subnet 2114 (e.g., the SSH subnet 1914 of FIG. 19), and the SSH VCN 2112 can be communicatively coupled to a control plane VCN 2116 (e.g., the control plane VCN 1916 of FIG. 19) via an LPG 2110 contained in the control plane VCN 2116 and to a data plane VCN 2118 (e.g., the data plane 1918 of FIG. 19) via an LPG 2110 contained in the data plane VCN 2118. The control plane VCN 2116 and the data plane VCN 2118 can be contained in a service tenancy 2119 (e.g., the service tenancy 1919 of FIG. 19).

The control plane VCN 2116 can include a control plane DMZ tier 2120 (e.g., the control plane DMZ tier 1920 of FIG. 19) that can include load balancer (LB) subnet(s) 2122 (e.g., LB subnet(s) 1922 of FIG. 19), a control plane app tier 2124 (e.g., the control plane app tier 1924 of FIG. 19) that can include app subnet(s) 2126 (e.g., similar to app subnet(s) 1926 of FIG. 19), a control plane data tier 2128 (e.g., the control plane data tier 1928 of FIG. 19) that can include DB subnet(s) 2130. The LB subnet(s) 2122 contained in the control plane DMZ tier 2120 can be communicatively coupled to the app subnet(s) 2126 contained in the control plane app tier 2124 and to an Internet gateway 2134 (e.g., the Internet gateway 1934 of FIG. 19) that can be contained in the control plane VCN 2116, and the app subnet(s) 2126 can be communicatively coupled to the DB subnet(s) 2130 contained in the control plane data tier 2128 and to a service gateway 2136 (e.g., the service gateway of FIG. 19) and a network address translation (NAT) gateway 2138 (e.g., the NAT gateway 1938 of FIG. 19). The control plane VCN 2116 can include the service gateway 2136 and the NAT gateway 2138.

The data plane VCN 2118 can include a data plane app tier 2146 (e.g., the data plane app tier 1946 of FIG. 19), a data plane DMZ tier 2148 (e.g., the data plane DMZ tier 1948 of FIG. 19), and a data plane data tier 2150 (e.g., the data plane data tier 1950 of FIG. 19). The data plane DMZ tier 2148 can include LB subnet(s) 2122 that can be communicatively coupled to trusted app subnet(s) 2160 and untrusted app subnet(s) 2162 of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include one or more primary VNICs 2164(1)-(N) that can be communicatively coupled to tenant virtual machines (VMs) 2166(1)-(N). Each tenant VM 2166(1)-(N) can be communicatively coupled to a respective app subnet 2167(1)-(N) that can be contained in respective container egress VCNs 2168(1)-(N) that can be contained in respective customer tenancies 2170(1)-(N). Respective secondary VNICs 2172(1)-(N) can facilitate communication between the untrusted app subnet(s) 2162 contained in the data plane VCN 2118 and the app subnet contained in the container egress VCNs 2168(1)-(N). Each container egress VCNs 2168(1)-(N) can include a NAT gateway 2138 that can be communicatively coupled to public Internet 2154 (e.g., public Internet 1954 of FIG. 19).

The Internet gateway 2134 contained in the control plane VCN 2116 and contained in the data plane VCN 2118 can be communicatively coupled to a metadata management service 2152 (e.g., the metadata management system 1952 of FIG. 19) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively couple to cloud services 2156.

In some embodiments, the data plane VCN 2118 can be integrated with customer tenancies 2170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 2146. Code to run the function may be executed in the VMs 2166(1)-(N), and the code may not be configured to run anywhere else on the data plane VCN 2118. Each VM 2166(1)-(N) may be connected to one customer tenancy 2170. Respective containers 2171(1)-(N) contained in the VMs 2166(1)-(N) may be configured to run the code. In this case, there can be a dual isolation (e.g., the containers 2171(1)-(N) running code, where the containers 2171(1)-(N) may be contained in at least the VM 2166(1)-(N) that are contained in the untrusted app subnet(s) 2162), which may help prevent incorrect or otherwise undesirable code from damaging the network of the IaaS provider or from damaging a network of a different customer. The containers 2171(1)-(N) may be communicatively coupled to the customer tenancy 2170 and may be configured to transmit or receive data from the customer tenancy 2170. The containers 2171(1)-(N) may not be configured to transmit or receive data from any other entity in the data plane VCN 2118. Upon completion of running the code, the IaaS provider may kill or otherwise dispose of the containers 2171(1)-(N).

In some embodiments, the trusted app subnet(s) 2160 may run code that may be owned or operated by the IaaS provider. In this embodiment, the trusted app subnet(s) 2160 may be communicatively coupled to the DB subnet(s) 2130 and be configured to execute CRUD operations in the DB subnet(s) 2130. The untrusted app subnet(s) 2162 may be communicatively coupled to the DB subnet(s) 2130, but in this embodiment, the untrusted app subnet(s) may be configured to execute read operations in the DB subnet(s) 2130. The containers 2171(1)-(N) that can be contained in the VM 2166(1)-(N) of each customer and that may run code from the customer may not be communicatively coupled with the DB subnet(s) 2130.

In other embodiments, the control plane VCN 2116 and the data plane VCN 2118 may not be directly communicatively coupled. In this embodiment, there may be no direct communication between the control plane VCN 2116 and the data plane VCN 2118. However, communication can occur indirectly through at least one method. An LPG 2110 may be established by the IaaS provider that can facilitate communication between the control plane VCN 2116 and the data plane VCN 2118. In another example, the control plane VCN 2116 or the data plane VCN 2118 can make a call to cloud services 2156 via the service gateway 2136. For example, a call to cloud services 2156 from the control plane VCN 2116 can include a request for a service that can communicate with the data plane VCN 2118.

Figure 22:
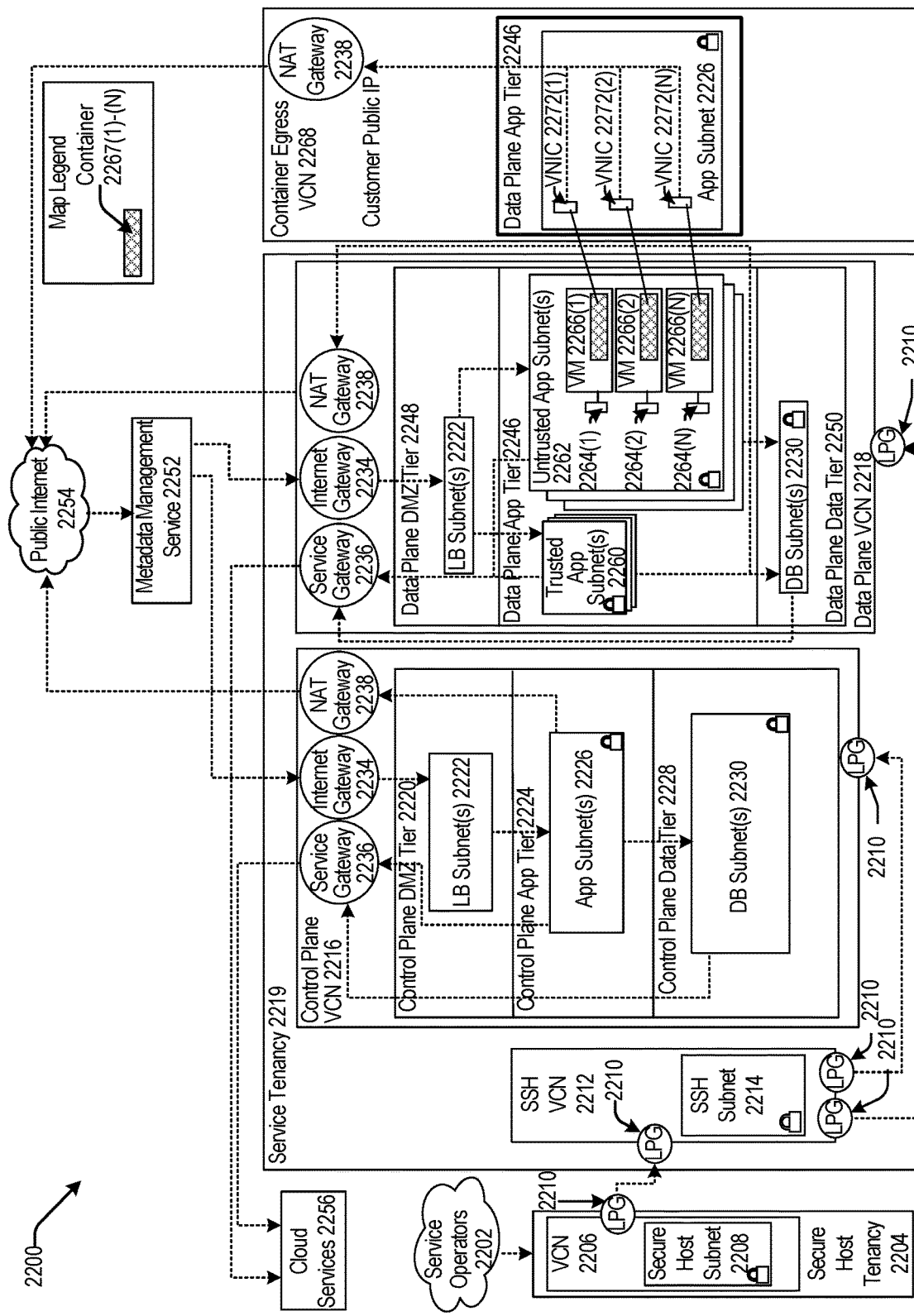
FIG. 22 is a block diagram illustrating another pattern for implementing a cloud infrastructure as a service system, according to at least one embodiment.

FIG. 22 is a block diagram 2200 illustrating another example pattern of an IaaS architecture, according to at least one embodiment. Service operators 2202 (e.g., service operators 1902 of FIG. 19) can be communicatively coupled to a secure host tenancy 2204 (e.g., the secure host tenancy 1904 of FIG. 19) that can include a virtual cloud network (VCN) 2206 (e.g., the VCN 1906 of FIG. 19) and a secure host subnet 2208 (e.g., the secure host subnet 1908 of FIG. 19). The VCN 2206 can include an LPG 2210 (e.g., the LPG 1910 of FIG. 19) that can be communicatively coupled to an SSH VCN 2212 (e.g., the SSH VCN 1912 of FIG. 19) via an LPG 2210 contained in the SSH VCN 2212. The SSH VCN 2212 can include an SSH subnet 2214 (e.g., the SSH subnet 1914 of FIG. 19), and the SSH VCN 2212 can be communicatively coupled to a control plane VCN 2216 (e.g., the control plane VCN 1916 of FIG. 19) via an LPG 2210 contained in the control plane VCN 2216 and to a data plane VCN 2218 (e.g., the data plane 1918 of FIG. 19) via an LPG 2210 contained in the data plane VCN 2218. The control plane VCN 2216 and the data plane VCN 2218 can be contained in a service tenancy 2219 (e.g., the service tenancy 1919 of FIG. 19).

The control plane VCN 2216 can include a control plane DMZ tier 2220 (e.g., the control plane DMZ tier 1920 of FIG. 19) that can include LB subnet(s) 2222 (e.g., LB subnet(s) 1922 of FIG. 19), a control plane app tier 2224 (e.g., the control plane app tier 1924 of FIG. 19) that can include app subnet(s) 2226 (e.g., app subnet(s) 1926 of FIG. 19), a control plane data tier 2228 (e.g., the control plane data tier 1928 of FIG. 19) that can include DB subnet(s) 2230 (e.g., DB subnet(s) 2130 of FIG. 21). The LB subnet(s) 2222 contained in the control plane DMZ tier 2220 can be communicatively coupled to the app subnet(s) 2226 contained in the control plane app tier 2224 and to an Internet gateway 2234 (e.g., the Internet gateway 1934 of FIG. 19) that can be contained in the control plane VCN 2216, and the app subnet(s) 2226 can be communicatively coupled to the DB subnet(s) 2230 contained in the control plane data tier 2228 and to a service gateway 2236 (e.g., the service gateway of FIG. 19) and a network address translation (NAT) gateway 2238 (e.g., the NAT gateway 1938 of FIG. 19). The control plane VCN 2216 can include the service gateway 2236 and the NAT gateway 2238.

The data plane VCN 2218 can include a data plane app tier 2246 (e.g., the data plane app tier 1946 of FIG. 19), a data plane DMZ tier 2248 (e.g., the data plane DMZ tier 1948 of FIG. 19), and a data plane data tier 2250 (e.g., the data plane data tier 1950 of FIG. 19). The data plane DMZ tier 2248 can include LB subnet(s) 2222 that can be communicatively coupled to trusted app subnet(s) 2260 (e.g., trusted app subnet(s) 2160 of FIG. 21) and untrusted app subnet(s) 2262 (e.g., untrusted app subnet(s) 2162 of FIG. 21) of the data plane app tier 2246 and the Internet gateway 2234 contained in the data plane VCN 2218. The trusted app subnet(s) 2260 can be communicatively coupled to the service gateway 2236 contained in the data plane VCN 2218, the NAT gateway 2238 contained in the data plane VCN 2218, and DB subnet(s) 2230 contained in the data plane data tier 2250. The untrusted app subnet(s) 2262 can be communicatively coupled to the service gateway 2236 contained in the data plane VCN 2218 and DB subnet(s) 2230 contained in the data plane data tier 2250. The data plane data tier 2250 can include DB subnet(s) 2230 that can be communicatively coupled to the service gateway 2236 contained in the data plane VCN 2218.

The untrusted app subnet(s) 2262 can include primary VNICs 2264(1)-(N) that can be communicatively coupled to tenant virtual machines (VMs) 2266(1)-(N) residing within the untrusted app subnet(s) 2262. Each tenant VM 2266(1)-(N) can run code in a respective container 2267(1)-(N), and be communicatively coupled to an app subnet 2226 that can be contained in a data plane app tier 2246 that can be contained in a container egress VCN 2268. Respective secondary VNICs 2272(1)-(N) can facilitate communication between the untrusted app subnet(s) 2262 contained in the data plane VCN 2218 and the app subnet contained in the container egress VCN 2268. The container egress VCN can include a NAT gateway 2238 that can be communicatively coupled to public Internet 2254 (e.g., public Internet 1954 of FIG. 19).

The Internet gateway 2234 contained in the control plane VCN 2216 and contained in the data plane VCN 2218 can be communicatively coupled to a metadata management service 2252 (e.g., the metadata management system 1952 of FIG. 19) that can be communicatively coupled to public Internet 2254. Public Internet 2254 can be communicatively coupled to the NAT gateway 2238 contained in the control plane VCN 2216 and contained in the data plane VCN 2218. The service gateway 2236 contained in the control plane VCN 2216 and contained in the data plane VCN 2218 can be communicatively couple to cloud services 2256.

In some examples, the pattern illustrated by the architecture of block diagram 2200 of FIG. 22 may be considered an exception to the pattern illustrated by the architecture of block diagram 2100 of FIG. 21 and may be desirable for a customer of the IaaS provider if the IaaS provider cannot directly communicate with the customer (e.g., a disconnected region). The respective containers 2267(1)-(N) that are contained in the VMs 2266(1)-(N) for each customer can be accessed in real-time by the customer. The containers 2267(1)-(N) may be configured to make calls to respective secondary VNICs 2272(1)-(N) contained in app subnet(s) 2226 of the data plane app tier 2246 that can be contained in the container egress VCN 2268. The secondary VNICs 2272(1)-(N) can transmit the calls to the NAT gateway 2238 that may transmit the calls to public Internet 2254. In this example, the containers 2267(1)-(N) that can be accessed in real-time by the customer can be isolated from the control plane VCN 2216 and can be isolated from other entities contained in the data plane VCN 2218. The containers 2267(1)-(N) may also be isolated from resources from other customers.

In other examples, the customer can use the containers 2267(1)-(N) to call cloud services 2256. In this example, the customer may run code in the containers 2267(1)-(N) that requests a service from cloud services 2256. The containers 2267(1)-(N) can transmit this request to the secondary VNICs 2272(1)-(N) that can transmit the request to the NAT gateway that can transmit the request to public Internet 2254. Public Internet 2254 can transmit the request to LB subnet(s) 2222 contained in the control plane VCN 2216 via the Internet gateway 2234. In response to determining the request is valid, the LB subnet(s) can transmit the request to app subnet(s) 2226 that can transmit the request to cloud services 2256 via the service gateway 2236.

It should be appreciated that IaaS architectures 1900, 2000, 2100, 2200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 23:
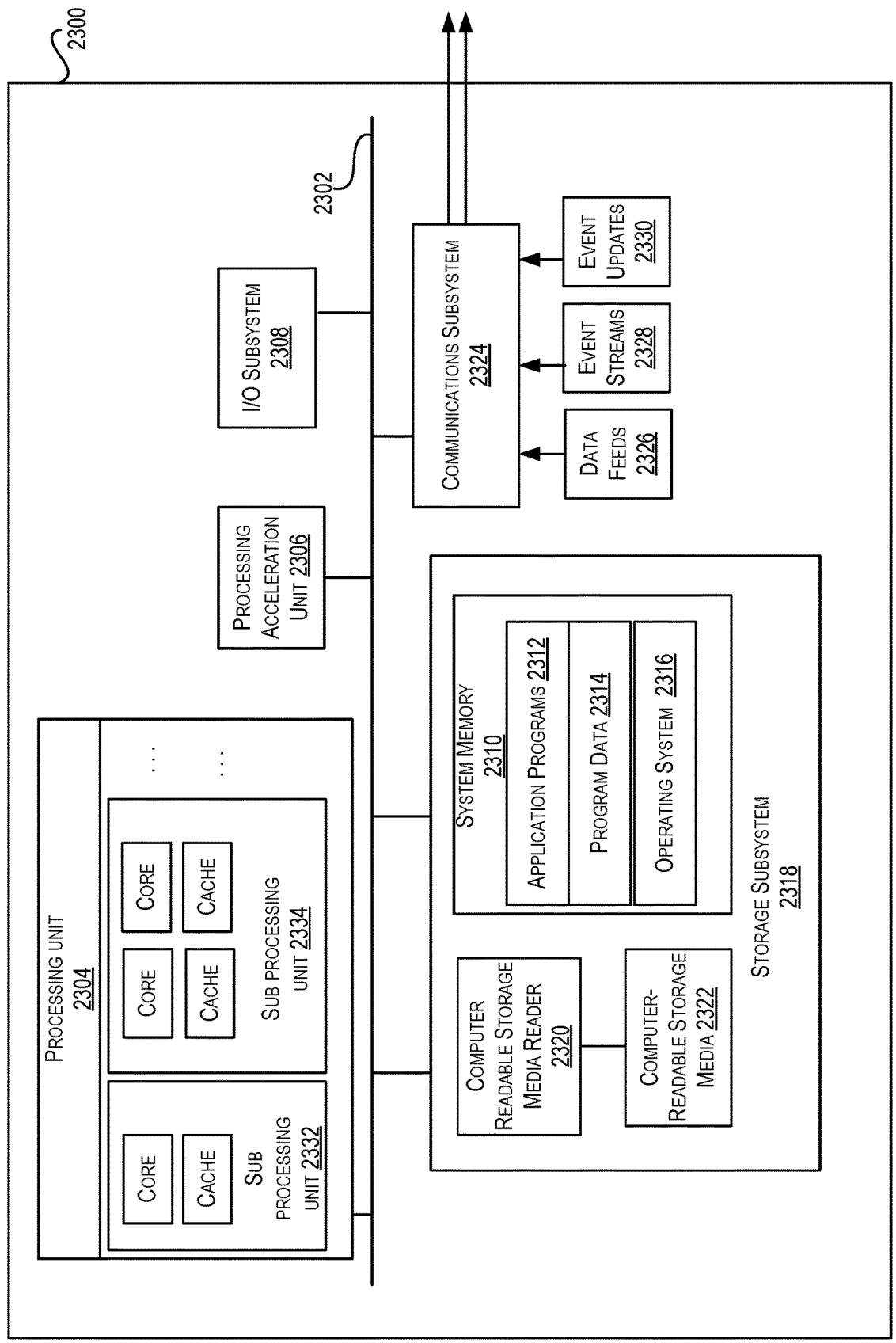
FIG. 23 is a block diagram illustrating an example computer system, according to at least one embodiment.

FIG. 23 illustrates an example computer system 2300, in which various embodiments may be implemented. The system 2300 may be used to implement any of the computer systems described above. As shown in the figure, computer system 2300 includes a processing unit 2304 that communicates with a number of peripheral subsystems via a bus subsystem 2302. These peripheral subsystems may include a processing acceleration unit 2306, an I/O subsystem 2308, a storage subsystem 2318 and a communications subsystem 2324. Storage subsystem 2318 includes tangible computer-readable storage media 2322 and a system memory 2310.

Bus subsystem 2302 provides a mechanism for letting the various components and subsystems of computer system 2300 communicate with each other as intended. Although bus subsystem 2302 is shown schematically as a single bus, alternative embodiments of the bus subsystem may utilize multiple buses. Bus subsystem 2302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2304, which can be implemented as one or more integrated circuits (e.g., a conventional microprocessor or microcontroller), controls the operation of computer system 2300. One or more processors may be included in processing unit 2304. These processors may include single core or multicore processors. In certain embodiments, processing unit 2304 may be implemented as one or more independent processing units 2332 and/or 2334 with single or multicore processors included in each processing unit. In other embodiments, processing unit 2304 may also be implemented as a quad-core processing unit formed by integrating two dual-core processors into a single chip.

In various embodiments, processing unit 2304 can execute a variety of programs in response to program code and can maintain multiple concurrently executing programs or processes. At any given time, some or all of the program code to be executed can be resident in processor(s) 2304 and/or in storage subsystem 2318. Through suitable programming, processor(s) 2304 can provide various functionalities described above. Computer system 2300 may additionally include a processing acceleration unit 2306, which can include a digital signal processor (DSP), a special-purpose processor, and/or the like.

I/O subsystem 2308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2300 may comprise a storage subsystem 2318 that comprises software elements, shown as being currently located within a system memory 2310. System memory 2310 may store program instructions that are loadable and executable on processing unit 2304, as well as data generated during the execution of these programs.

Depending on the configuration and type of computer system 2300, system memory 2310 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2304. In some implementations, system memory 2310 may include multiple different types of memory, such as static random access memory (SRAM) or dynamic random access memory (DRAM). In some implementations, a basic input/output system (BIOS), containing the basic routines that help to transfer information between elements within computer system 2300, such as during start-up, may typically be stored in the ROM. By way of example, and not limitation, system memory 2310 also illustrates application programs 2312, which may include client applications, Web browsers, mid-tier applications, relational database management systems (RDBMS), etc., program data 2314, and an operating system 2316. By way of example, operating system 2316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 2318 may also provide a tangible computer-readable storage medium for storing the basic programming and data constructs that provide the functionality of some embodiments. Software (programs, code modules, instructions) that when executed by a processor provide the functionality described above may be stored in storage subsystem 2318. These software modules or instructions may be executed by processing unit 2304. Storage subsystem 2318 may also provide a repository for storing data used in accordance with the present disclosure.

Storage subsystem 2300 may also include a computer-readable storage media reader 2320 that can further be connected to computer-readable storage media 2322. Together and, optionally, in combination with system memory 2310, computer-readable storage media 2322 may comprehensively represent remote, local, fixed, and/or removable storage devices plus storage media for temporarily and/or more permanently containing, storing, transmitting, and retrieving computer-readable information.

Computer-readable storage media 2322 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2300.

By way of example, computer-readable storage media 2322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2322 may include, but is not limited to, Zip® drives, flash memory cards, universal serial bus (USB) flash drives, secure digital (SD) cards, DVD disks, digital video tape, and the like. Computer-readable storage media 2322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2300.

Communications subsystem 2324 provides an interface to other computer systems and networks. Communications subsystem 2324 serves as an interface for receiving data from and transmitting data to other systems from computer system 2300. For example, communications subsystem 2324 may enable computer system 2300 to connect to one or more devices via the Internet. In some embodiments communications subsystem 2324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 2324 can provide wired network connectivity (e.g., Ethernet) in addition to or instead of a wireless interface.

In some embodiments, communications subsystem 2324 may also receive input communication in the form of structured and/or unstructured data feeds 2326, event streams 2328, event updates 2330, and the like on behalf of one or more users who may use computer system 2300.

By way of example, communications subsystem 2324 may be configured to receive data feeds 2326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2324 may also be configured to receive data in the form of continuous data streams, which may include event streams 2328 of real-time events and/or event updates 2330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 2324 may also be configured to output the structured and/or unstructured data feeds 2326, event streams 2328, event updates 2330, and the like to one or more databases that may be in communication with one or more streaming data source computers coupled to computer system 2300.

Computer system 2300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
receiving, by a GraphQL Application Programming Interface (API) design system implemented using one or more computing systems, a selection of a datasource type to create a GraphQL Application Programing Interface (API) schema;
processing, by the GraphQL Application Programming Interface (API) design system, the selected datasource type to obtain metadata associated with the selected datasource type, wherein the metadata comprises a set of individual elements associated with the selected datasource type;
outputting, by the GraphQL Application Programming Interface (API) design system, the set of individual elements associated with the selected datasource type via a set of one or more User Interface (UI) screens associated with the GraphQL Application Programming Interface (API) design system;
receiving, by the GraphQL Application Programming Interface (API) design system, a selection of one or more individual elements from the set of individual elements associated with the selected datasource type via the set of one or more UI screens;
processing, by the GraphQL Application Programming Interface (API) design system, the selected one or more individual elements to generate a set of object types for the GraphQL Application Programming Interface (API) schema, a set of object fields associated with the set of object types for the GraphQL Application Programming Interface (API) schema, and a set of queries supported by the set of object types for the GraphQL Application Programming Interface (API) schema; and
outputting, by the GraphQL Application Programming Interface (API) design system, via the set of one or more UI screens, the GraphQL API schema for the selected datasource type, the GraphQL API schema comprising the set of object types for the GraphQL Application Programming Interface (API) schema, the set of object fields associated with the set of object types for the GraphQL Application Programming Interface (API) schema, the set of queries supported by the set of object types for the GraphQL Application Programming Interface (API) schema, and a set of resolver functions associated with the set of object types for the GraphQL Application Programming Interface (API) schema.

2. The method of claim 1, wherein the selected datasource type is a relational database.

3. The method of claim 2, wherein processing, by the GraphQL Application Programming Interface (API) design system, the selected datasource type comprises introspecting the relational database to determine a set of individual elements associated with the relational database.

4. The method of claim 3, wherein the set of individual elements associated with the relational database comprise a set of one or more tables within the relational database, a set of one or more columns associated with the set of one or more tables and a set of one or more operations supported by the set of one or more tables and the set of one or more columns.

5. The method of claim 1, wherein outputting, by the GraphQL Application Programming Interface (API) design system, the set of individual elements associated with the selected datasource type comprises outputting a set of one or more tables associated with a relational database and a set of one or more columns associated with the set of one or more tables via the set of one or more UI screens, wherein the selected datasource type is the relational database.

6. The method of claim 1, wherein receiving, by the GraphQL Application Programming Interface (API) design system, a selection of one or more individual elements from the set of individual elements associated with the selected datasource type comprises receiving a selection of one or more tables associated with a relational database, wherein the selected datasource type is the relational database.

7. The method of claim 6, further comprising receiving, by the GraphQL Application Programming Interface (API) design system, a selection of one or more columns associated with the one or more tables and receiving a selection of one or more operations supported by the one or more tables via the set of one or more UI screens.

8. The method of claim 1, wherein the selected datasource type is a relational database and wherein outputting, by the GraphQL Application Programming Interface (API) design system, the GraphQL API schema for the selected datasource type comprises outputting the GraphQL API schema for the relational database.

9. The method of claim 1, wherein the selected datasource type is a Representational State Transfer (REST) Application Programing Interface (API) datasource.

10. The method of claim 9, wherein processing, by the GraphQL Application Programming Interface (API) design system, the selected datasource type comprises introspecting the REST API datasource to determine a set of individual elements associated with the REST API datasource.

11. The method of claim 10, wherein the set of individual elements associated with the REST API datasource comprise a set of one or more APIs associated with the REST API datasource, one or more query parameters associated with the set of one or more APIs and response information associated with the set of one or more APIs.

12. The method of claim 1, wherein receiving, by the GraphQL Application Programming Interface (API) design system, the selection of one or more individual elements from the set of individual elements associated with the selected datasource type comprises receiving a selection of one or more APIs associated with a REST API datasource, wherein the selected datasource type is the REST API datasource.

13. The method of claim 1, further comprising:
receiving, by the GraphQL Application Programming Interface (API) design system, a selection of an object type from the set of object types defined in the GraphQL API schema via the set of one or more UI screens;
receiving, by the GraphQL Application Programming Interface (API) design system, an indication to edit a resolver function associated with the selected object type; and
responsive to receiving the indication, presenting, by the GraphQL Application Programming Interface (API) design system, structural information associated with the selected object type.

14. The method of claim 13, further comprising:
receiving, by the GraphQL Application Programming Interface (API) design system, a modification to the structural information associated with the selected object type;
based on the modification, editing, by the GraphQL Application Programming Interface (API) design system, the resolver function associated with the selected object type; and
publishing, by the GraphQL Application Programming Interface (API) design system, a modified GraphQL API schema via the set of one or more UI screens.

15. A system comprising:
a memory; and
one or more processors configured to perform processing, the processing comprising:
receiving a selection of a datasource type to create a GraphQL Application Programing Interface (API) schema;
processing the selected datasource type to obtain metadata associated with the selected datasource type, wherein the metadata comprises a set of individual elements associated with the selected datasource type;
outputting the set of individual elements associated with the selected datasource type via a set of one or more User Interface (UI) screens associated with the system;
receiving a selection of one or more individual elements from the set of individual elements associated with the selected datasource type via the set of one or more UI screens;
processing the selected one or more individual elements to generate a set of object types for the GraphQL Application Programming Interface (API) schema, a set of object fields associated with the set of object types for the GraphQL Application Programming Interface (API) schema, and a set of queries supported by the set of object types for the GraphQL Application Programming Interface (API) schema; and
outputting the GraphQL API schema for the selected datasource type, the GraphQL API schema comprising the set of object types for the GraphQL Application Programming Interface (API) schema, the set of object fields associated with the set of object types for the GraphQL Application Programming Interface (API) schema, the set of queries supported by the set of object types for the GraphQL Application Programming Interface (API) schema, and a set of resolver functions associated with the set of object types.

16. The system of claim 15 further comprising:
receiving a selection of an object type from the set of object types defined in the GraphQL API schema via the set of one or more UI screens;
receiving an indication to edit a resolver function associated with the selected object type; and
responsive to receiving the indication, presenting structural information associated with the selected object type.

17. The system of claim 16 further comprising:
receiving a modification to the structural information associated with the selected object type;
based on the modification, editing the resolver function associated with the selected object type; and
publishing a modified GraphQL API schema via the set of one or more UI screens.

18. A non-transitory computer-readable medium storing instructions executable by a computer system that, when executed by one or more processors of the computer system, cause the one or more processors to perform operations comprising:
receiving a selection of a datasource type to create a GraphQL Application Programing Interface (API) schema;
processing the selected datasource type to obtain metadata associated with the selected datasource type, wherein the metadata comprises a set of individual elements associated with the selected datasource type;
outputting the set of individual elements associated with the selected datasource type via a set of one or more User Interface (UI) screens associated with the system;
receiving a selection of one or more individual elements from the set of individual elements associated with the selected datasource type via the set of one or more UI screens;
processing the selected one or more individual elements to generate a set of object types for the GraphQL Application Programming Interface (API) schema, a set of object fields associated with the set of object types for the GraphQL Application Programming Interface (API) schema, and a set of queries supported by the set of object types for the GraphQL Application Programming Interface (API) schema; and
outputting the GraphQL API schema for the selected datasource type, the GraphQL API schema comprising the set of object types for the GraphQL Application Programming Interface (API) schema, the set of object fields associated with the set of object types the GraphQL Application Programming Interface (API) schema, the set of queries supported by the set of object types for the GraphQL Application Programming Interface (API) schema, and a set of resolver functions associated with the set of object types.

19. The non-transitory computer-readable medium of claim 18, wherein the selected datasource type is a relational database.

20. The non-transitory computer-readable medium of claim 18, wherein the selected datasource type is a Representational State Transfer (REST) Application Programing Interface (API) datasource.

* * * * *